US007602516B2

(12) United States Patent
Ito

(10) Patent No.: US 7,602,516 B2
(45) Date of Patent: Oct. 13, 2009

(54) IMAGE PROCESSING SYSTEM, APPARATUS, METHOD, AND STORAGE MEDIUM STORING A COMPUTER PROGRAM, FOR COMBINING IMAGE DATA USING MULTIPLE DEVICES

(75) Inventor: Akio Ito, Yokohama (JP)

(73) Assignee: Canon Kabushiki Kaisha (JP)

( * ) Notice: Subject to any disclaimer, the term of this patent is extended or adjusted under 35 U.S.C. 154(b) by 539 days.

(21) Appl. No.: 11/222,150

(22) Filed: Sep. 8, 2005

(65) Prior Publication Data

US 2006/0050310 A1  Mar. 9, 2006

(30) Foreign Application Priority Data

Sep. 9, 2004  (JP)  ............................. 2004-262796

(51) Int. Cl.
*G06F 3/12* (2006.01)
(52) U.S. Cl. ...................... 358/1.15; 358/408; 358/450; 709/201
(58) Field of Classification Search ................ 358/1.15, 358/408, 450
See application file for complete search history.

(56) References Cited

U.S. PATENT DOCUMENTS 7,012,706 B1 * 3/2006 Hansen ....................... 358/1.15

| 2002/0184249 | A1* | 12/2002 | Shibata ....................... 707/204 |
| 2003/0202206 | A1* | 10/2003 | Shinchi ...................... 358/1.15 |
| 2004/0103208 | A1* | 5/2004 | Chung et al. ................ 709/236 |
| 2005/0024677 | A1* | 2/2005 | Miura et al. ............... 358/1.15 |
| 2005/0052664 | A1* | 3/2005 | Ferlitsch .................... 358/1.6 |
| 2005/0102397 | A1* | 5/2005 | Tsuyama et al. ............ 709/225 |

FOREIGN PATENT DOCUMENTS

| JP | 62-221047 A | 9/1987 |
| JP | 9-319885 A | 12/1997 |

* cited by examiner

*Primary Examiner*—Mark K Zimmerman
*Assistant Examiner*—Javier J Ramos
(74) *Attorney, Agent, or Firm*—Rossi, Kimms & McDowell LLP

(57) ABSTRACT

An image processing system make it possible to easily for electronizing paper documents can read a large quantity of manuscripts with image processing apparatuses to generate images. The system has multi function peripherals (MFP). One of the MFPs (combination destination) can send a management table for managing image data to another MFP (transmission source), which designates an image data combination position, generates a management table for managing the image data of the transmission source MFP, generates a management table, in which the management table of the transmission source is added to the management table of the combination destination, and transfers the image data of the transmission source MFP and the management tables to the combination destination MEP, which combines the image data of the transmission source MFP and the image data of the combination destination MFP based on the management tables and the combination position.

4 Claims, 23 Drawing Sheets

FIG. 13A

DESIGNATE COMBINATION DESTINATION APPARATUS — 1301

| APPARATUS NAME | LOCATIOIN |
|---|---|
| ☐ MFP1 | OFFICE ROOM 31 |
| ☐ MFP2 | OFFICE ROOM 32 |
| ☐ MFP3 | OFFICE ROOM 33 |

[OK] 1311  [RETURN] 1312

FIG. 13B

DESIGNATE COMBINING FILE — 1302

| DOCUMENT NAME | SIZE | PAGE | DATE/TIME |
|---|---|---|---|
| ⊞ 111.pdf | A4 | 50 | 2004/04/25 10:00 |
| ⊞ 222.pdf | A4 | 65 | 2004/05/10 12:00 |
| ☐ 333.pdf | A4 | 20 | 2004/05/12 12:00 |

[OK] 1311  [RETURN] 1312

FIG. 13C

DESIGNATE COMBINING FILE — 1303

| DOCUMENT NAME | SIZE | PAGE | DATE/TIME |
|---|---|---|---|
| ⊞ 111.pdf | A4 | 50 | 2004/04/25 10:00 |
| ⊞ 222.pdf | A4 | 65 | 2004/05/10 12:00 |
| ☐ 333.pdf | A4 | 20 | 2004/05/12 12:00 |

[OK] 1311  [RETURN] 1312

DESIGNATE COMBINATION POSITION

| COMBINATION POSITION | ORDER | DOCUMENT NAME | SIZE | PAGE | DATE/TIME | TRANSMITTER |
|---|---|---|---|---|---|---|
| △ | 1 | 111a.pdf | A4 | 10 | 2004/05/10 10:00 | xx |
| △ | 2 | 111b.pdf | A4 | 20 | 2004/05/10 11:00 | xx |
| △ | 3 | 111c.pdf | A4 | 30 | 2004/05/10 12:00 | yy |
| △ | | | | | | |

OK (1311)  RETURN (1312)

DESIGNATE COMBINATION POSITION

| COMBINATION POSITION | ORDER | DOCUMENT NAME | SIZE | PAGE | DATE/TIME | TRANSMITTER |
|---|---|---|---|---|---|---|
| △ | 1 | 111a.pdf | A4 | 10 | 2004/05/10 10:00 | xx |
| △ | 2 | 111b.pdf | A4 | 20 | 2004/05/10 11:00 | xx |
| △ | 3 | 111c.pdf | A4 | 30 | 2004/05/10 12:00 | yy |
| △ | 4 | new.pdf | | | | |

OK (1311)  RETURN (1312)

IMAGE PROCESSING SYSTEM, APPARATUS, METHOD, AND STORAGE MEDIUM STORING A COMPUTER PROGRAM, FOR COMBINING IMAGE DATA USING MULTIPLE DEVICES

BACKGROUND OF THE INVENTION

1. Field of the Invention

The present invention relates to an image processing system, an image processing apparatus, a control method, a program and a storage medium. In the image processing system, a plurality of the image processing apparatus such as digital multi function peripherals capable of storing image data are connected to one another through a network or the like. The image processing system can be applied to a case where image data is transmitted and received among the image processing apparatus.

2. Related Background Art

In recent years, the demand of the electronization of paper documents has been increased with the improvement of the functions of information working apparatus such as computers, and the enlargement of the capacity of memories such as hard disks. The reason of the increase of the demand is that the perusal, the retrieval and the working of a paper document can be performed at a high speed and easily if the information read from the paper document is electronized and is accumulated in the memory.

A conventional digital multi function peripheral equipped with a scanner unit, a printer unit, a network communication unit and the like can store the image data read from a manuscript with the scanner unit in a memory such as a hard disk in the digital multi function peripheral. The stored image data can be printed out by the printer unit, or can be transferred to an external computer through a network by the network communication unit.

Moreover, the digital multi function peripheral is provided with a function of selecting a plurality of pieces of image data stored in the memory such as the hard disk, of combination the selected plurality of pieces of image data as one document (a piece of image data), and of re-saving the combined document into the memory.

Moreover, the following technique was proposed as a method of editing a plurality of pieces of document information and a single or a plurality of pieces of image information to output a unit of edited document relative to combination print which combined document information and image information to print out the combined information.

For example, Japanese Patent Laid-Open No. 09-319885 proposes a method of display a plurality of pieces of document information on a display on a page basis, designating a part where the image information read from the manuscript with a scanner is inserted into the document information on a page basis, and editing the document information and the image information at the time of outputting the document information and the image information (as a printout or a facsimile transmission output). Thereby, even when mixed information in which the document information and the image information are mixed is printed out, it is possible to suppress the memory using capacity on the output apparatus side to the minimum while treating the image data having a large data amount.

However, the conventional example mentioned above has a problem in which the method of outputting the document information and the image information as a unit of edited document can be applied only in the case where the image information read from the manuscript with the scanner is inserted into the stored document information to be output (as the printout or the facsimile transmission output). Moreover, there is a problem that the conventional example mentioned above cannot be applied when the electronization processing of the image information of a lot of manuscripts is carried out using a plurality of scanners.

SUMMARY OF THE INVENTION

Accordingly, an object of the present invention is to provide an image processing system making it possible to easily and fast carry out the electronization processing of reading a large quantity of manuscripts with a plurality of image processing apparatus to generate a piece of electronic data from the images read from the large quantity of manuscripts, an image processing apparatus and a control method.

According to an aspect of the present invention, an image processing apparatus includes: an image data inputting unit, adapted to input image data of a transmission source; a sending unit, adapted to send combination destination management information to an image processing apparatus of the transmission source, the combination destination management information being for managing image data of a combination destination when the image data of the combination destination and the image data of the transmission source are combined; a first obtaining unit, adapted to obtain the combination destination management information; a designating unit, adapted to designate a combination of the image data of the transmission source with the image data of the combination destination; a first generating unit, adapted to generating transmission source management information for managing the image data of the transmission source; a second generating unit, adapted to generate update management information, in which the transmission source management information is added to the combination destination management information; a transferring unit, adapted to transfer the image data of the transmission source and the update management information to the image processing apparatus of the combination destination; a second obtaining unit, adapted to obtain the image data of the transmission source and the update management information; and a combining unit, adapted to combine the image data of the combination destination with the image data of the transmission source based on the update management information.

According to another aspect of the present invention, an image processing apparatus includes: an image data inputting unit, adapted to input image data; an obtaining unit, adapted to obtain combination destination management information for managing image data of an image processing apparatus of a combination destination; a designating unit, adapted to designate a combination of the image data input by the image data inputting unit with the image data of the combination destination; a first generating unit, adapted to generate transmission source management information for managing the image data input by the image data inputting unit; a second generating unit, adapted to generate update management information, in which the transmission source management information is added to the combination destination management information; and a transferring unit, adapted to transfer the image data input by the image data inputting unit and the update management information to the image processing apparatus of the combination destination.

According to another aspect of the present invention, an image processing apparatus includes: sending unit, adapted to send a combination destination management information to an image processing apparatus of a transmission source, the combination destination management information being for managing image data of an image processing apparatus of a combination destination when the image data of the image processing apparatus of the combination destination and image data of the image. processing apparatus of the transmission source are combined; an obtaining unit, adapted to obtain update management information, in which the combination destination management information is added to transmission source management information for managing the image data of the image processing apparatus of the transmission source, and the image data of the image processing apparatus of the transmission source; and a combining unit, adapted to combine the image data of the image processing apparatus of the combination destination with the image data of the image processing apparatus of the transmission source based on the update management information.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 13A is a view showing a display example of a combination destination apparatus designating screen, and FIGS. 13B and 13C are views showing display examples of a combination file designating screen;

FIGS. 14A and 14B are views showing display examples of a combination position designating screen;

DETAILED DESCRIPTION OF THE PREFERRED EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 2:
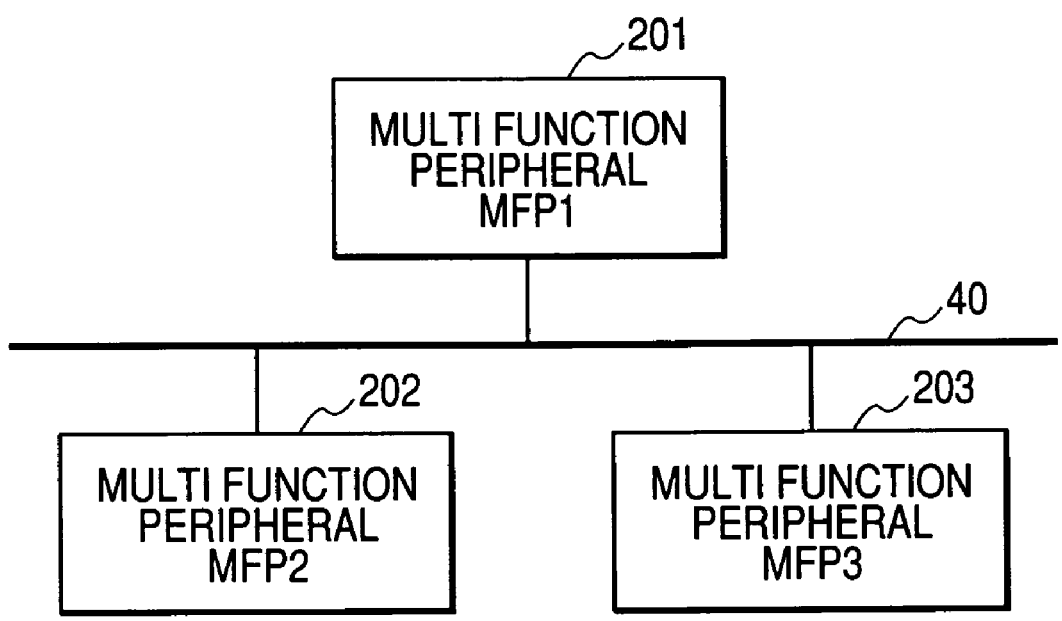
FIG. 2 is a schematic diagram showing a configuration example of an image processing system in which a plurality of digital multi function peripherals are connected through a network.

FIG. 2 is a schematic diagram showing a configuration example of an image processing system in which a plurality of digital multi function peripherals as image processing apparatus according to a first embodiment of the present invention is connected through a network.

In FIG. 2, the image processing system is composed of, for example, three sets of a digital multi function peripheral 201 (multi function peripheral (MFP) 1), a digital multi function peripheral 202 (MFP 2) and a digital multi function peripheral 203 (MFP 3). The digital multi function peripherals 201-203 are severally equipped with a network interface. The digital multi function peripherals 201-203 are connected to one another through a local area network (LAN) 40 as the network, and perform the transmission and reception of data through the LAN 40. Although a case where the network is set up as a wired LAN is exemplified in the present embodiment, wireless LAN may be adopted.

Figure 3:
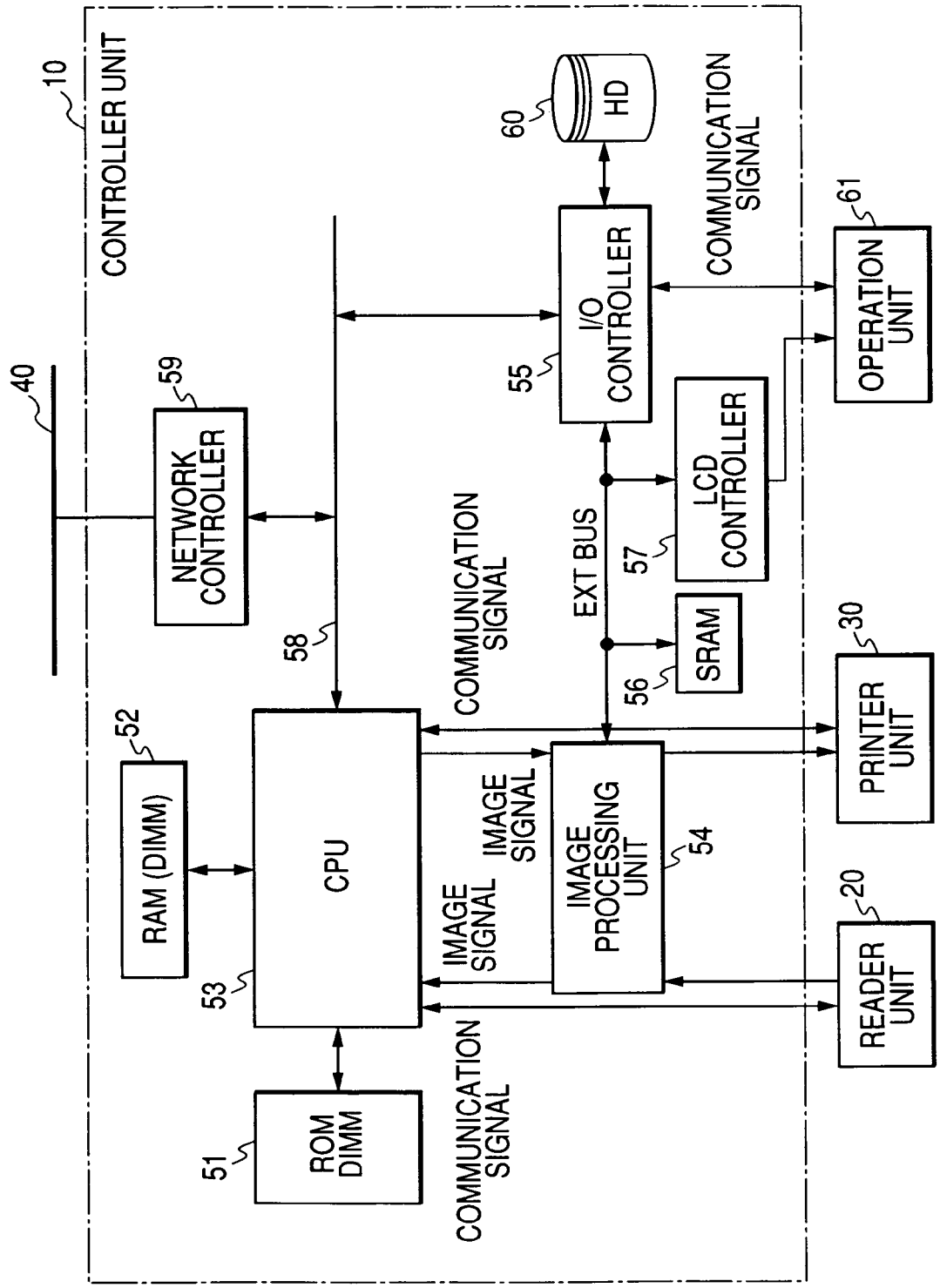
FIG. 3 is a block diagram showing a configuration example of a digital multi function peripheral.

FIG. 3 is a block diagram showing a configuration example of the digital multi function peripherals 201-203.

In FIG. 3, each of the digital multi function peripherals 201-203 is roughly composed of three units of a controller unit 10, which takes charge of the control of the whole digital multi function peripheral, a reader unit 20, which is an image input unit reading an image from a manuscript, and a printer unit 30, which is an image output unit forming an image in a printing paper. Furthermore, the controller unit 10 is equipped with a ROM (dual inline memory module (DIMM)) 51, a RAM (DIMM) 52, a CPU 53, an image processing unit 54, an I/O controller 55, a static RAM (SRAM) 56, a liquid crystal display (LCD) controller 57, a system bus 58, a network controller 59 and a hard disk drive (hereinafter simply referred to as HD) 60.

The controller unit 10 is connected with the reader unit 20 and the printer unit 30. On the other hand, the controller unit 10 is connected with LAN 40. Consequently, the controller unit 10 performs input and output of image data and device information. In the controller unit 10, the CPU 53 controls the whole digital multi function peripheral. Thus, the controller unit 10 is constructed as a controller IC having a built in image processing block. Moreover, the CPU 53 is equipped with a combination document management function and a document storage management function, which will be described later. The CPU 53 executes the processing shown in the flowcharts of FIGS. 1, 17-22 based on control programs. The RAM 52 is a system working memory for the CPU 53 to operate, and is also an image memory for storing image data temporarily. The ROM 51 is a boot ROM, and stores a system boot program.

The system bus 58 is constructed as a peripheral component interconnect (PCI) bus or the like, and can transmit and receive communication data, image data and the like at a high speed. The CPU 53 is connected to the I/O controller 55 and the network controller 59 through the system bus 58. The I/O controller 55 controls various I/O devices. The CPU 53 performs the access to the HD 60, the setting of data in the image processing unit 54, the display of data on an operation unit 61 with the LCD controller 57, and the like through the I/O controller 55. The network controller 59 performs the communication control with external apparatus on the LAN 40 (other digital multi function peripherals and computers).

The SRAM 56 is a memory backed up by a battery, and stores various settings pertaining to the digital multi function peripheral. The LCD controller 57 performs the display control to the operation unit 61. The HD 60 stores system software, image data, system management data, box managed data and the like. The operation unit 61 is a unit for a user to perform various settings of the digital multi function peripheral, and is equipped with various operation keys such as a start key, and a display unit, which displays various screens to be described later. The communication between the CPU 53 and the operation unit 61 is performed through the I/O controller 55, and CPU 53 sets up the data displayed on the operation unit 61 to the LCD controller 57, and the controller unit 10 is constructed so that the LCD controller 57 transmits display data to the operation unit 61.

The image processing unit 54 is a block which performs various kinds of image processing such as the reduction, the expansion, and the luminance-density conversion of image data. The image processing unit 54 is composed of an image processing section of input image data from the reader unit 20, and an image processing section of output image data to the printer unit 30. The image data read from the manuscript by the reader unit 20 is input into the CPU 53 through the image processing unit 54, and is temporarily stored in the RAM 52. In the inside of the CPU 53, a block performing the compression processing, the expansion processing and the rotation processing of image data is installed, and the CPU 53 can execute the various kinds of processing described above by accessing the image data stored in the RAM 52.

The image data is transferred to the HD 60 and stored therein after having received the compression processing. The image data stored in the HD 60 can be read by the CPU 53. After the image data has received the expansion processing by the CPU 53, the image data can be formed as an image by the printer unit 30, or the image data can be transmitted to an external apparatus (other digital multi function peripherals or computers) on the LAN 40 through the network.

The digital multi function peripheral can communicate with other digital multi function peripherals and computers which are connected to the LAN 40 through the network controller 59. The print data transmitted from a computer to the digital multi function peripheral is input into the CPU 53 through the network controller 59. A raster image processor (RIP) in the CPU 53 expands the page description language (PDL) code of the received print data to a bit-mapped image. The expanded image data is transferred to the printer unit 30, and image formation is performed on a printing paper.

The reader unit 20 is an image input unit which radiates light to a manuscript placed on a manuscript stand (not shown) or a manuscript fed by an automatic manuscript feeding apparatus, images the reflected light from the manuscript on an image pickup device through an optical system (mirror/lens), and photoelectrically converts the optical image into an electric signal with the image pickup device to perform the image reading of the manuscript. The image data read from the manuscript by the reader unit 20 is sent out to the image processing unit 54, and is sent out to the controller unit 10.

The printer unit 30 is an image output unit which forms an image on a printing paper based on image data. As the image formation system of the printer unit 30, there are an electrophotography system, which transfers an image on a printing paper through a photosensitive drum or a photosensitive belt, an ink-jet system, which discharges ink from a minute nozzle array to print an image directly on a printing paper, and the like. Any image formation systems may be adopted in the present embodiment. The starting of the image formation operation of the printer unit 30 is started by an instruction from the controller unit 10. The printer unit 30 is equipped with a plurality of paper feeding steps in order to select different paper sizes or different printing paper directions, and is equipped with a paper cassette corresponding to the paper feeding steps. Then, the printer unit 30 is constructed to eject the printing paper on which an image has been formed on a catch tray.

Figure 4:
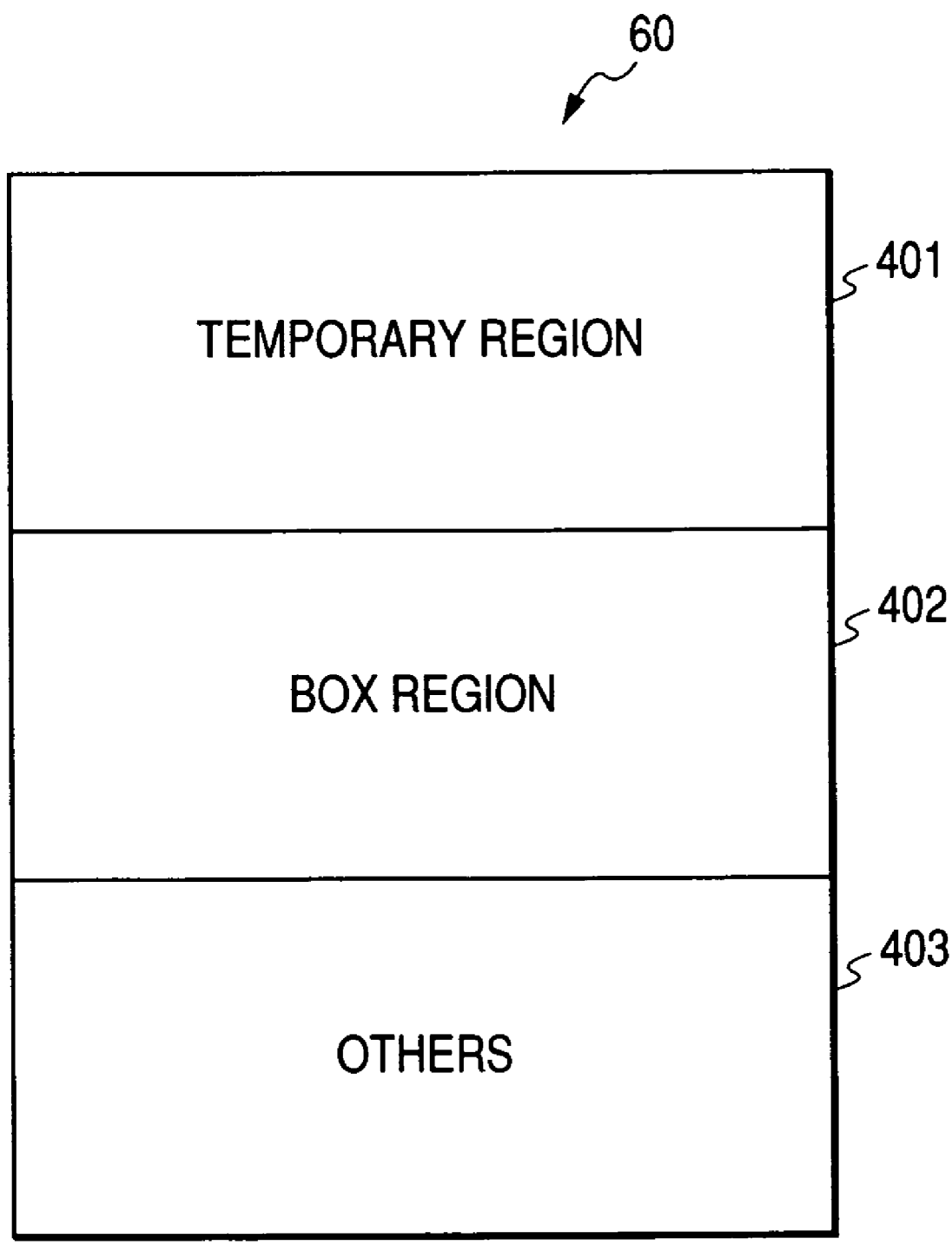
FIG. 4 is a view showing a configuration example of the storage region of the HD of the digital multi function peripheral.

FIG. 4 is a view showing a configuration example of the storage region of the HD 60 of each of the digital multi function peripherals 201-203.

In FIG. 4, the storage region of the HD 60 is divided into a temporary region 401, a box region 402, and the other regions 403 according to intended uses. The temporary region 401 is a storage region storing image data output from the reader unit 20 temporarily in order to make it possible to change an output order of the image data, or to perform plural copy output of copying a plurality of copies of a manuscript image by one reading of the image.

The box region 402 is a storage region for storing image data for a long time. It is also possible to divide the box region 402 into small box regions for every user or every department which uses the box region 402. Moreover, a box name and a password can be set to the box region 402. A user can store image data in the box region 402 by designating a box, and can select and output the image data stored in the box region 402. The control program of the digital multi function peripheral and the like are stored in the other regions 403. The program and the like are transmitted to the RAM 52 at the time of power source starting, and the control program is executed.

Figure 5:
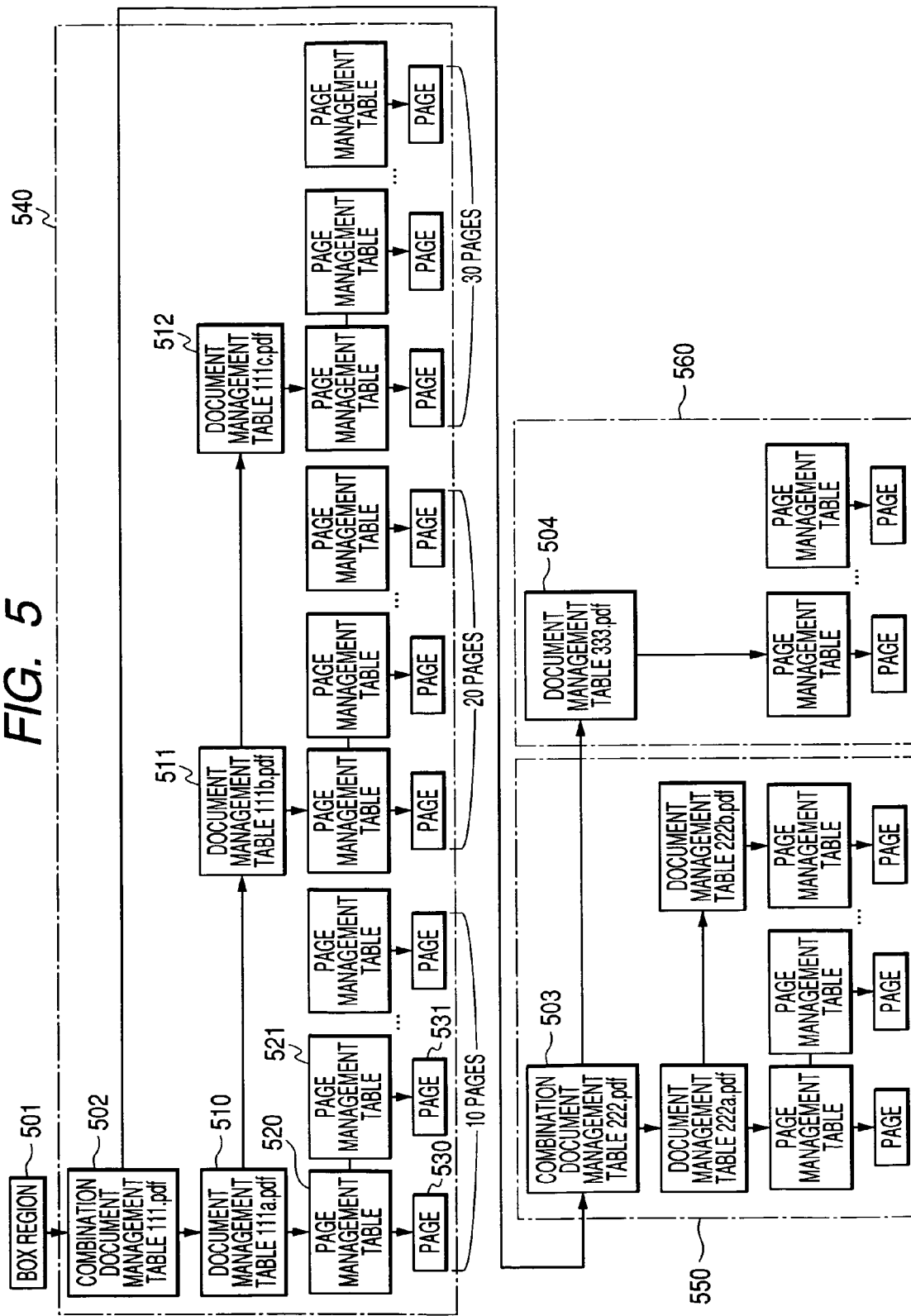
FIG. 5 is a block diagram showing the document management configuration in the box region of the HD.

FIG. 5 is a block diagram showing the document management configuration in the box region 402 of the HD 60.

In FIG. 5, the image data stored in the box region 402 shown in FIG. 4 is managed in the form of a pyramid. The management is constructed as follows. That is, image data (page) 530 indicates one-page image data, and is managed under the page management table 520. Furthermore, the page management table 520 is managed under the document management table 510, and the document management table 510 is managed under a combination document management table 502.

A box region 501 indicates an access destination at the time of accessing the box region 402 shown in FIG. 4. Three documents of a combination document 111.pdf, a combination document 222.pdf and a combination document 333.pdf are stored in the box region 501. Moreover, it is shown that three document management tables of a combination document management table (111. pdf) 502, a combination document management table (222. pdf) 503 and a combination document management table (333. pdf) 504 are stored. In the diagram, reference numerals 540, 550 and 560 denote storage regions in the box region 501.

The combination document means a document generated by a combination of a plurality of documents. The combination document 111.pdf is composed of three documents of a document 111a.pdf, a document 111b.pdf and a document 111c.pdf. It is shown that the combination document management table (111.pdf) 502 is composed of three document management tables of a document management table (111a.pdf) 510, a document management table (111b.pdf) 511 and a document management table (111c.pdf) 512.

It is shown that the document 111a.pdf is composed of 10 pages of image data 530, 531 . . . . It is shown that the document 111b.pdf is composed of 20 pages of image data. It is shown that the document 111c.pdf is composed of 30 pages of image data. The image data 530, 531 . . . show one page of the stored image data. The page management tables 520 and 521 are tables in which the data of managing the image data 530, 531 . . . , respectively, is stored.

Figure 6:
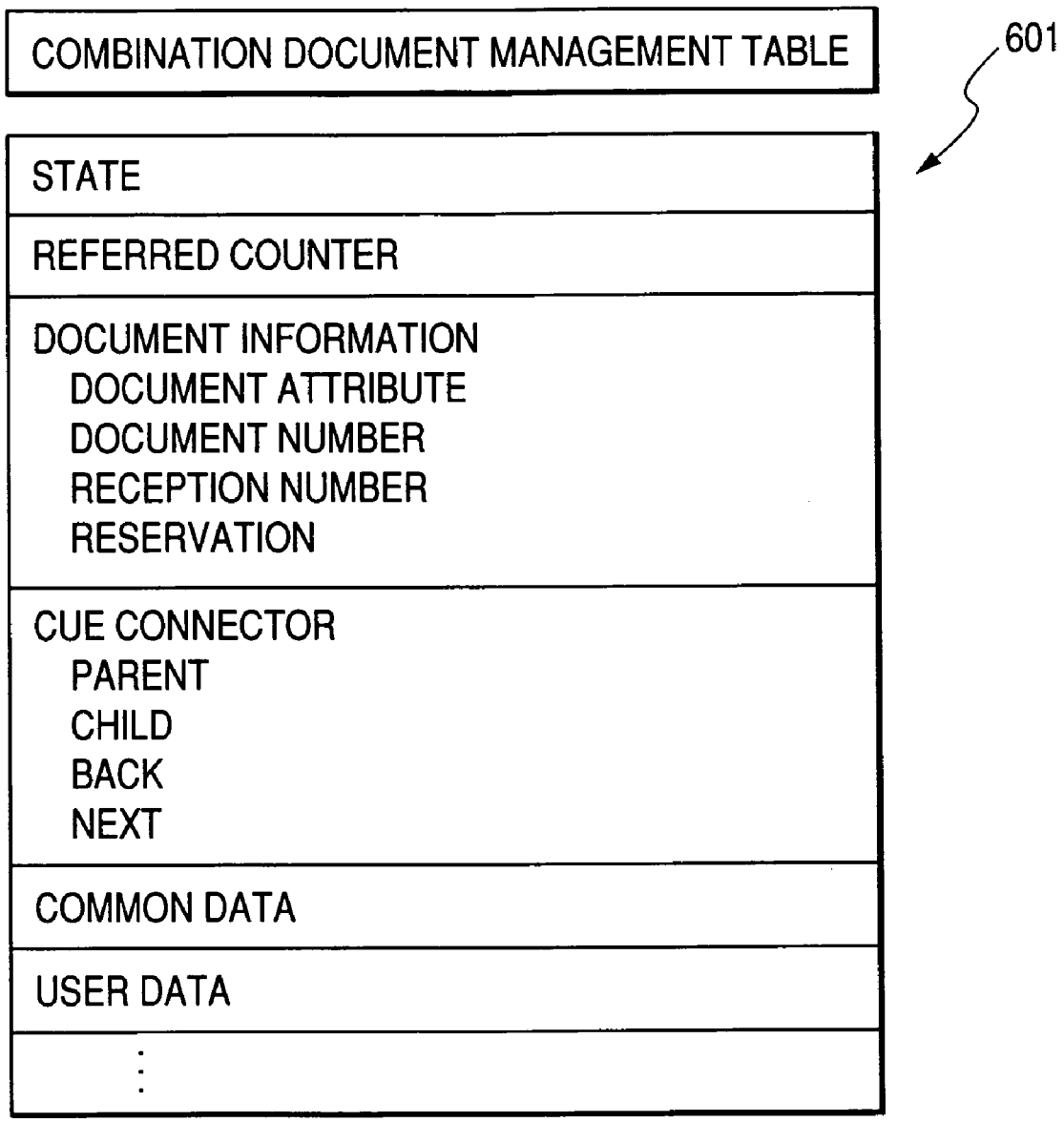
FIG. 6 is a view showing a configuration example of a combination document management table.

FIG. 6 is a view showing a configuration example of a combination document management table.

In FIG. 6, a combination document management table 601 is composed of an arrangement of a plurality of document control blocks (a "state", a "reference counter" . . . ). When a document is used by the combination document management function of the CPU 53 of the controller unit 10, a corresponding "state" member of a document control block becomes "in use."

The "referred counter" is one of realizing a mechanism for owning the same document by a plurality of jobs, and is used for managing the number of times of reference of the same document with the combination document management function of the CPU 53 when a plurality of transmission jobs or print jobs are thrown to the same document. When the deletion of a document is instructed to the combination document management function of the CPU 53, the document is deleted at the time point when the "referred counter" of the document becomes "0" as a result of operated by "-1", and the "state" member is changed to "unused."

A "document attribute" indicates whether a black-and-white binary image or a color image is included in a document or not. A "document number" indicates the number of combined documents. A "reception number" indicates a management serial number at the time of the generation of a document, and is used in order that a user may identify the document which he or she generated by himself. For example, the "reception number" is displayed in a job list in order that the user can identify which document is included in a job when the user executes a transmission job or a print job to the document.

A "cue connector" holds the ID of a storage destination of related cue data. When the combination document management table 502 shown in. FIG. 5 is exemplified, the parent cue indicates the management data of the box region 501, and a child cue indicates the document management table 510. Moreover, the next cue indicates the combination document management table 503, and no back-cues exist.

Figure 7:
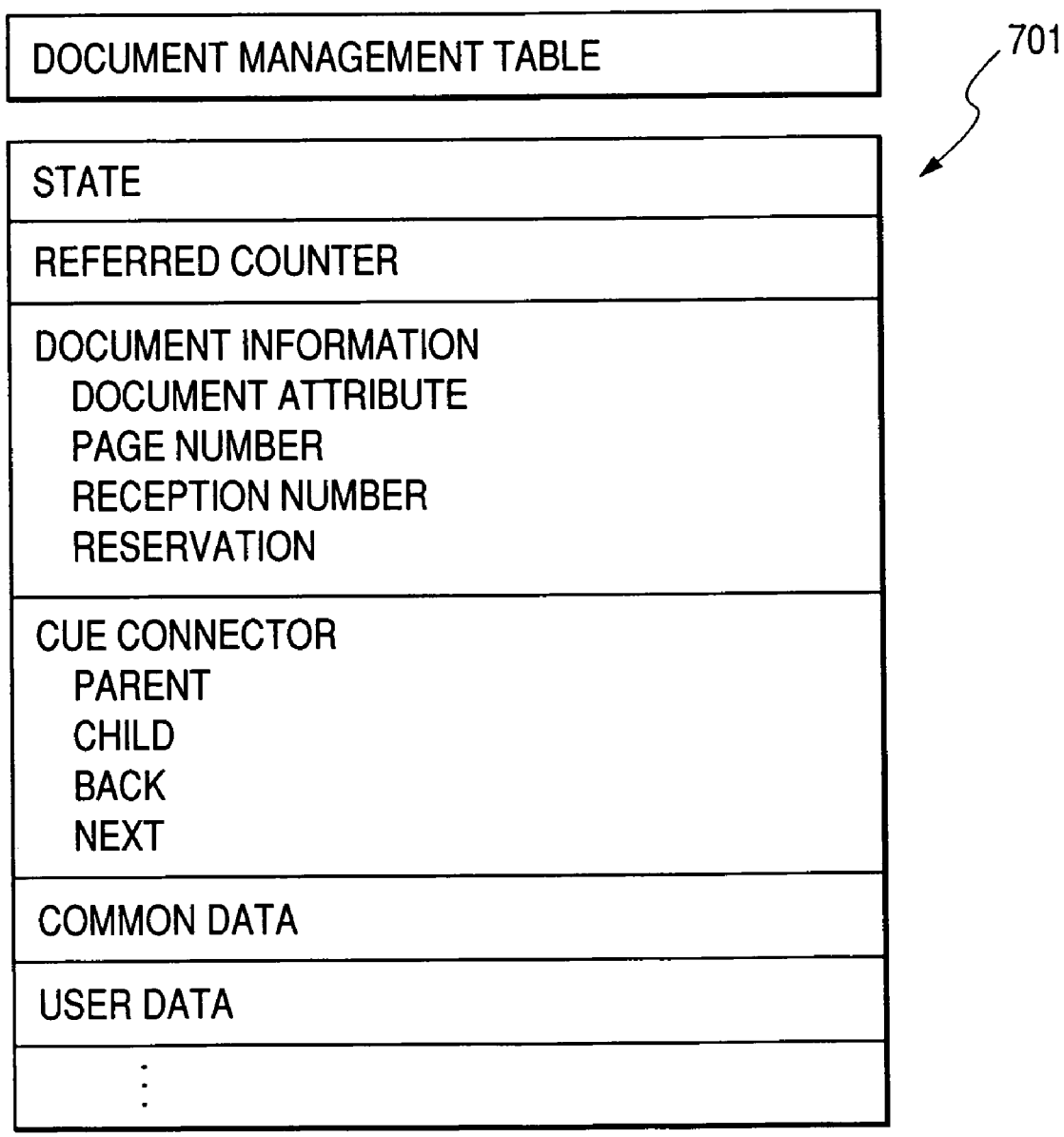
FIG. 7 is a view showing a configuration example of a document management table.

FIG. 7 is a view showing a configuration example of a document management table.

In FIG. 7, a document management table 701 has almost the same configuration as that of the combination document management table 601. In the document management table 701, a page number is set instead of the document number in the combination document management table 601. Like the document management table 504 shown in FIG. 5, when no combination documents exist, the document management table 701 is referred to instead of the combination document management table 601.

Figure 8:
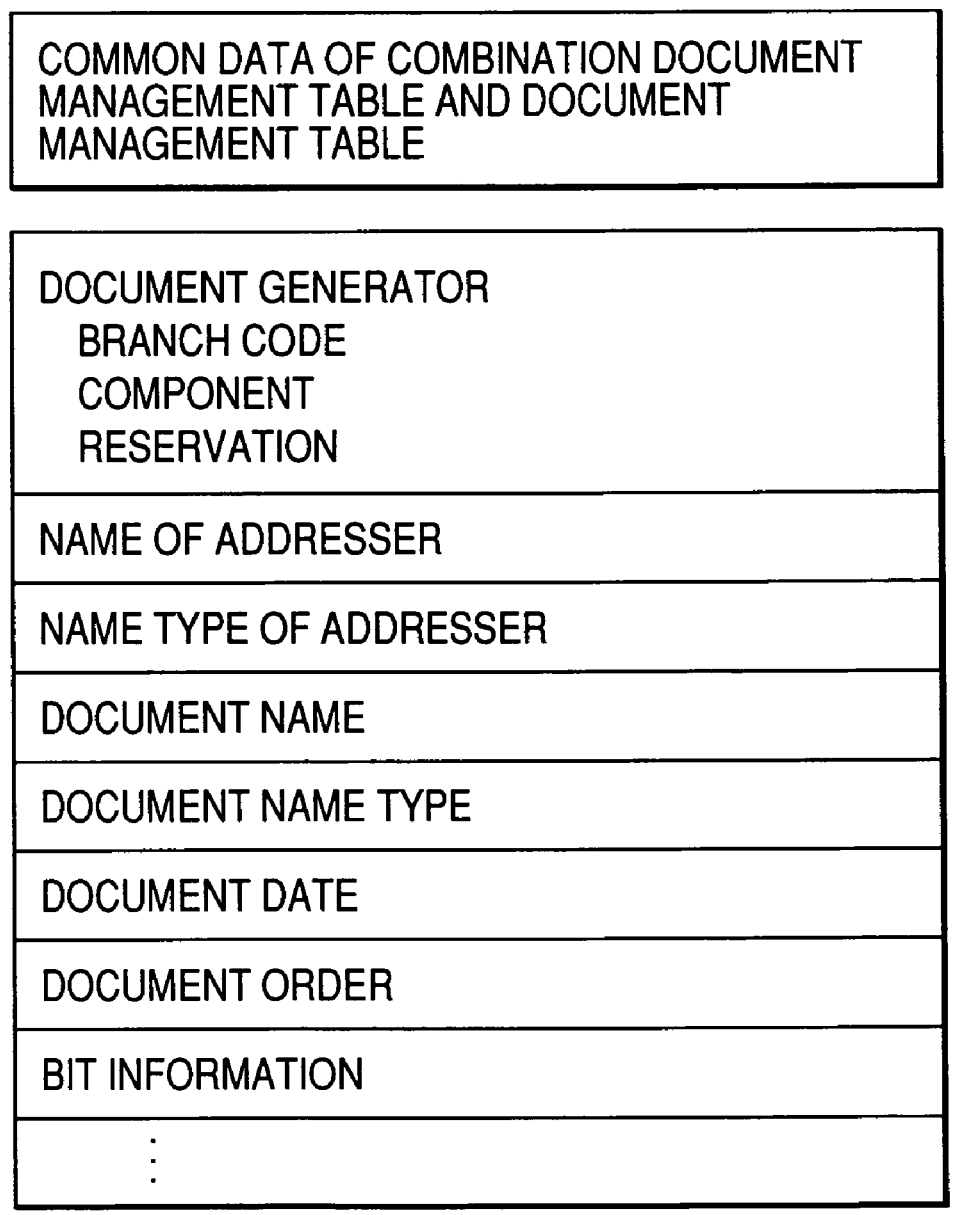
FIG. 8 is a view showing a configuration example of common data for combination document management tables, and common data for document management tables.

FIG. 8 is a view showing a configuration example of the common data for combination document management tables and the common data for document management tables.

In FIG. 8, a "document generator" in a common data for combination document management tables and common data for document management tables 801 indicates a data region for managing the information at the time of the generation of a document. A "section code" is a section code to which a user belongs. The "section code" is input when the user operates a digital multi function peripheral. The "section code" is a data region for carrying out the branch management of the status of use of the digital multi function peripheral. The section code is used, for example, in order to manage the printing sheet number or communication jobs for every section. Moreover, the section code is used in order to identify which branch a document has been generated concerning the document listed on a document list of the documents which the document storage management function of the CPU 53 of the control unit 10 manages.

A "component" is a data region for identifying by which function part (component) of the digital multi function peripheral the document has been generated. For example, "SCAN" is set in the "component" in case of a document read from a manuscript, and "PRINT" is set in the "component" in case of a document of print reception. In a "name of addresser", for example, when a name of an addresser is set at the time of reading a manuscript, the name of addresser is set. A "document name" is a document name received from a remote facsimile machine at the time of the data reception by the facsimile. A "document date" indicates a generation date, a time, and a second of a document.

Figure 9:
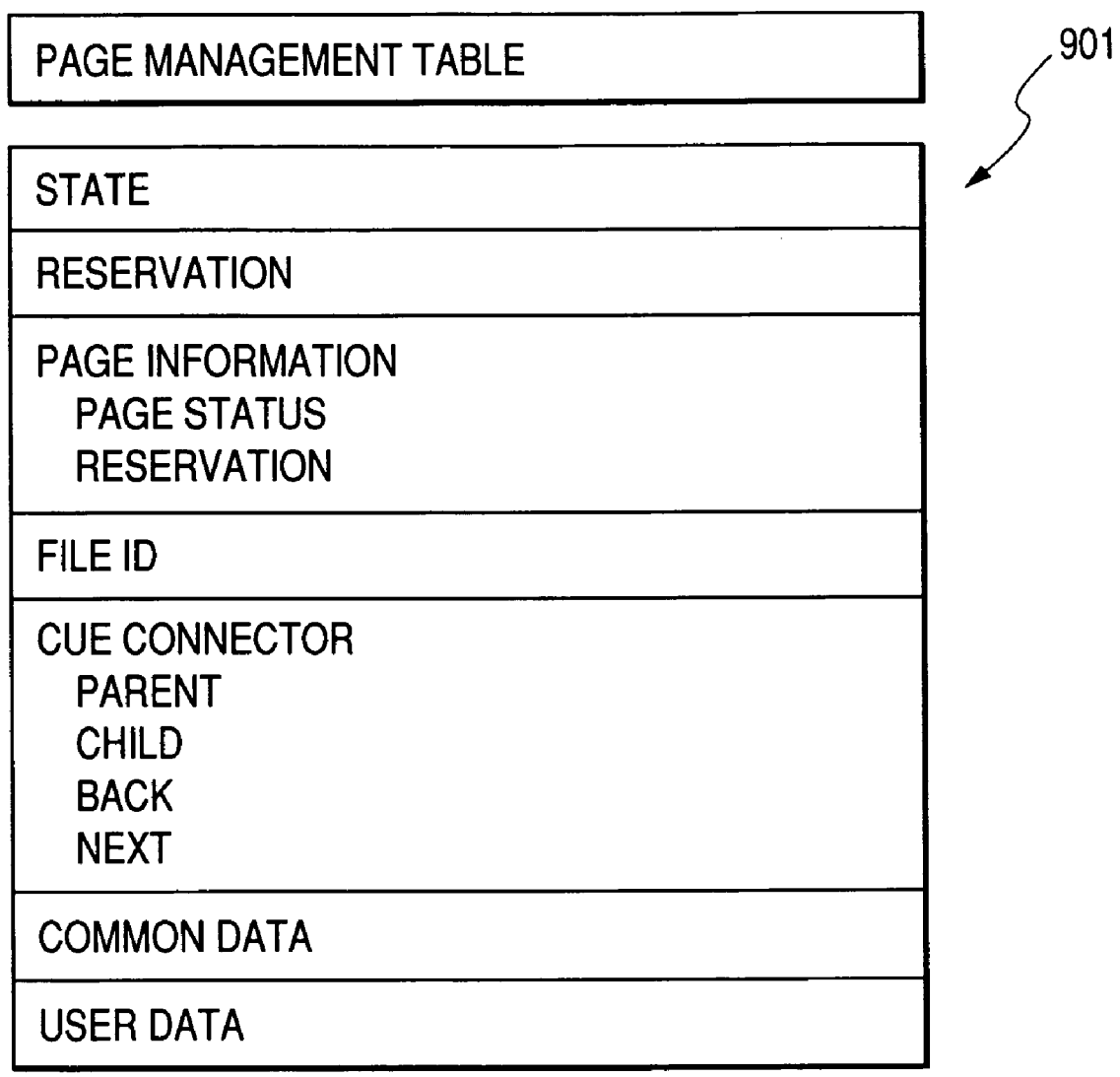
FIG. 9 is a view showing a configuration example of a page management table.

FIG. 9 is a view showing a configuration example of a page management table.

In FIG. 9, a page management table 901 is a table for managing the page information for every one image which document storing management means manages, and is composed of an arrangement of a plurality of page control blocks. When image data is stored in the HD 60 by the document storage management function of the CPU 53, the corresponding "state" member of a page control block becomes "in use."

"Page information" is a management data group which manages an image attribute. A "file ID" is a page control block in which a file ID for designating an image file stored in the HD 60 is set, and the region for the image number of sheets managed to the same manuscript is secured. "Common data" is a management data region for managing an image attribute.

Figure 10:
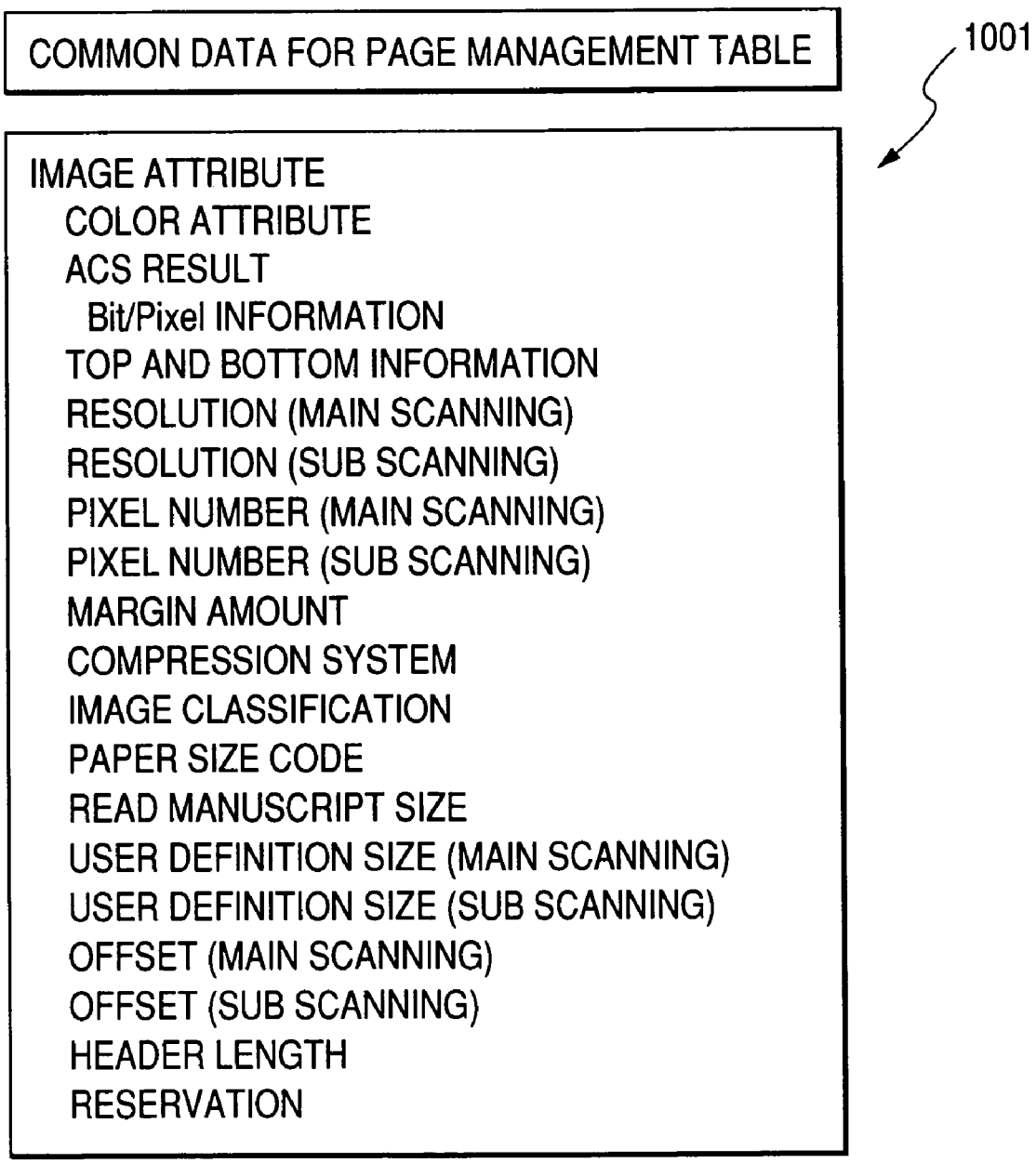
FIG. 10 is a view showing a configuration example of common data for page management tables.

FIG. 10 is a view showing a configuration example of the common data for page management tables.

In FIG. 10, in a common data for page management tables 1001, the region for the number of sheets of the images managed to the same manuscript is secured. A "color attribute" shows the color information of an image. When an image is monotone, B/W is set. When an image is color, R, G and B (red, green and blue) and C, M, Y and K (cyan, magenta, yellow and black) are set. An "ACS result" indicates a result of an automatic color selection, and B/W or a color is set according to the result of the automatic color selection. "Bit/Pixel information" indicates the number of bits per pixel (gradation).

"Top and bottom information" indicates the top and the bottom of an image. In "resolution" and "pixel number", the resolution and the pixel number of the main scanning and the sub scanning of each page are set, respectively. A "margin amount" indicates the margin amount at the time of forming an image to a printing paper. A "compression system" indicates a compression system such as RAW, Joint Photographic Experts Group (JPEG) and Joint Bi-level Image Experts Group (JBIG). "Image classification" indicates a mode at the time of reading a manuscript, and a character mode, a photograph mode or the like is set. Regarding the other data, like the above, the corresponding data is severally set according to the image data read from the manuscript with the reader unit 20.

Next, referring to FIGS. 1 and 11-15, a combination of the image data (documents) in digital multi function peripherals in the image processing system of the present embodiment is described in detail.

Figure 11:
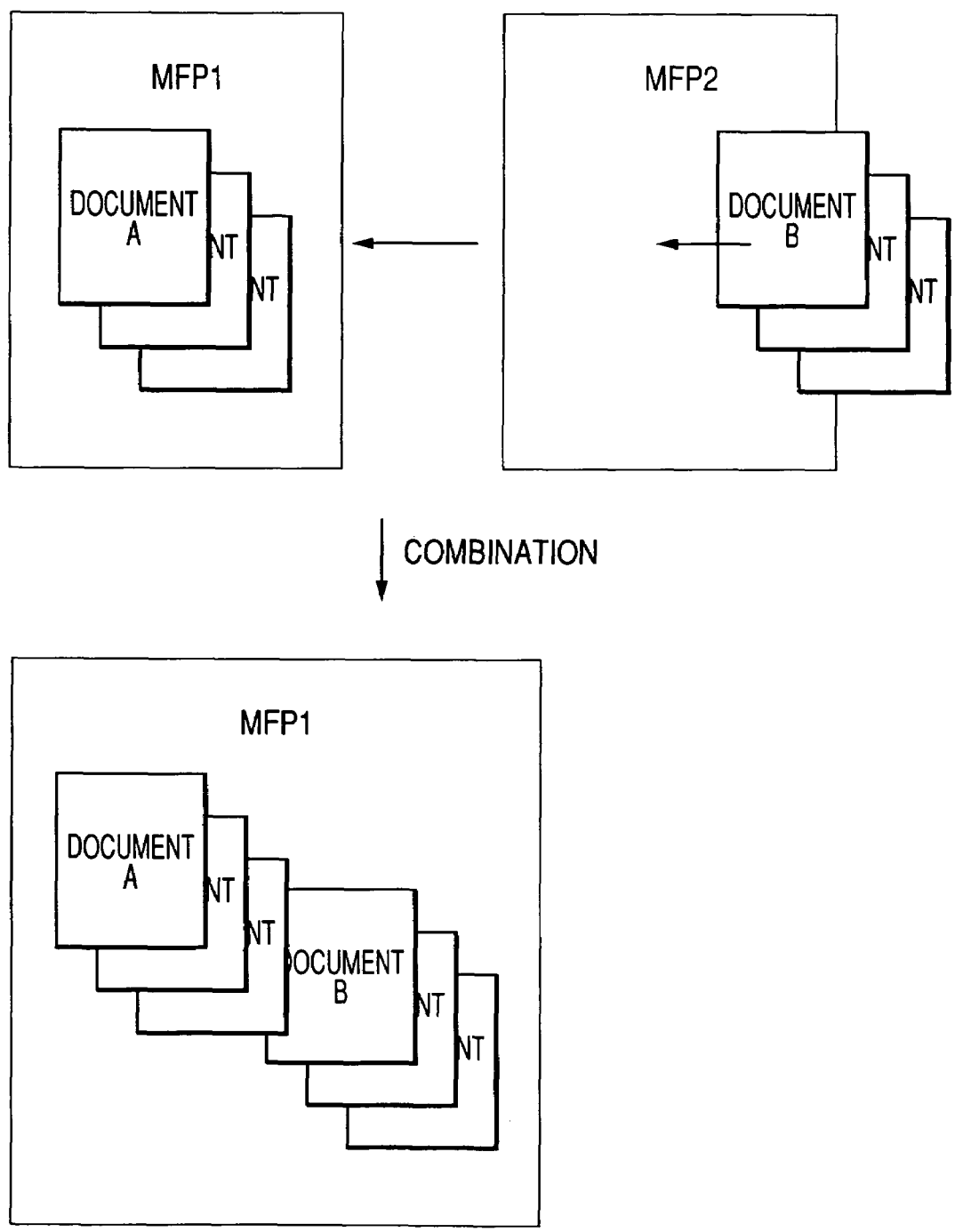
FIG. 11 is a view showing an image of the image data combination at the time of using two sets of the digital multi function peripherals according to the first embodiment of the present invention.

FIG. 11 is a view showing the image of a combination of image data (documents).

In FIG. 11, it is supposed that a document A is stored in the box region of the HD 60 of a digital multi function peripheral (MFP1), for example. The combination is performed as follows. That is, a document B is read by the reader unit 20 of a digital multi function peripheral (MFP 2), and the image data read from the document B is transmitted to the digital multi function peripheral (MFP 1). Thereby, the digital multi function peripheral (MFP 1) combines the image data of the document A and the image data of the document B to generate them as a document.

Figure 1:
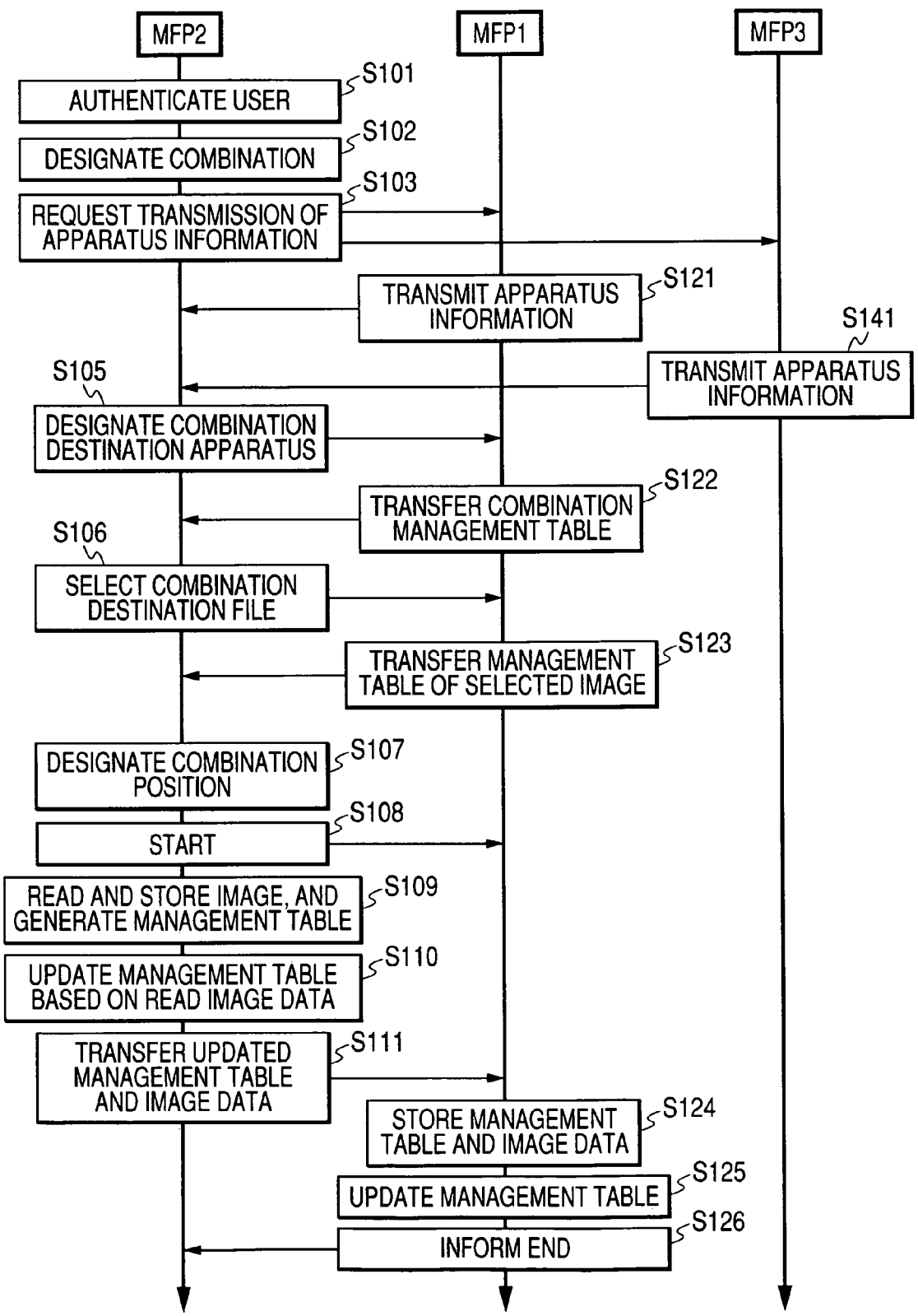
FIG. 1 is a flowchart showing image data combining processing of digital multi function peripherals as image processing apparatus according to a first embodiment of the present invention.

FIG. 1 is a flowchart showing image data combining processing of a digital multi function peripheral.

Figure 12:
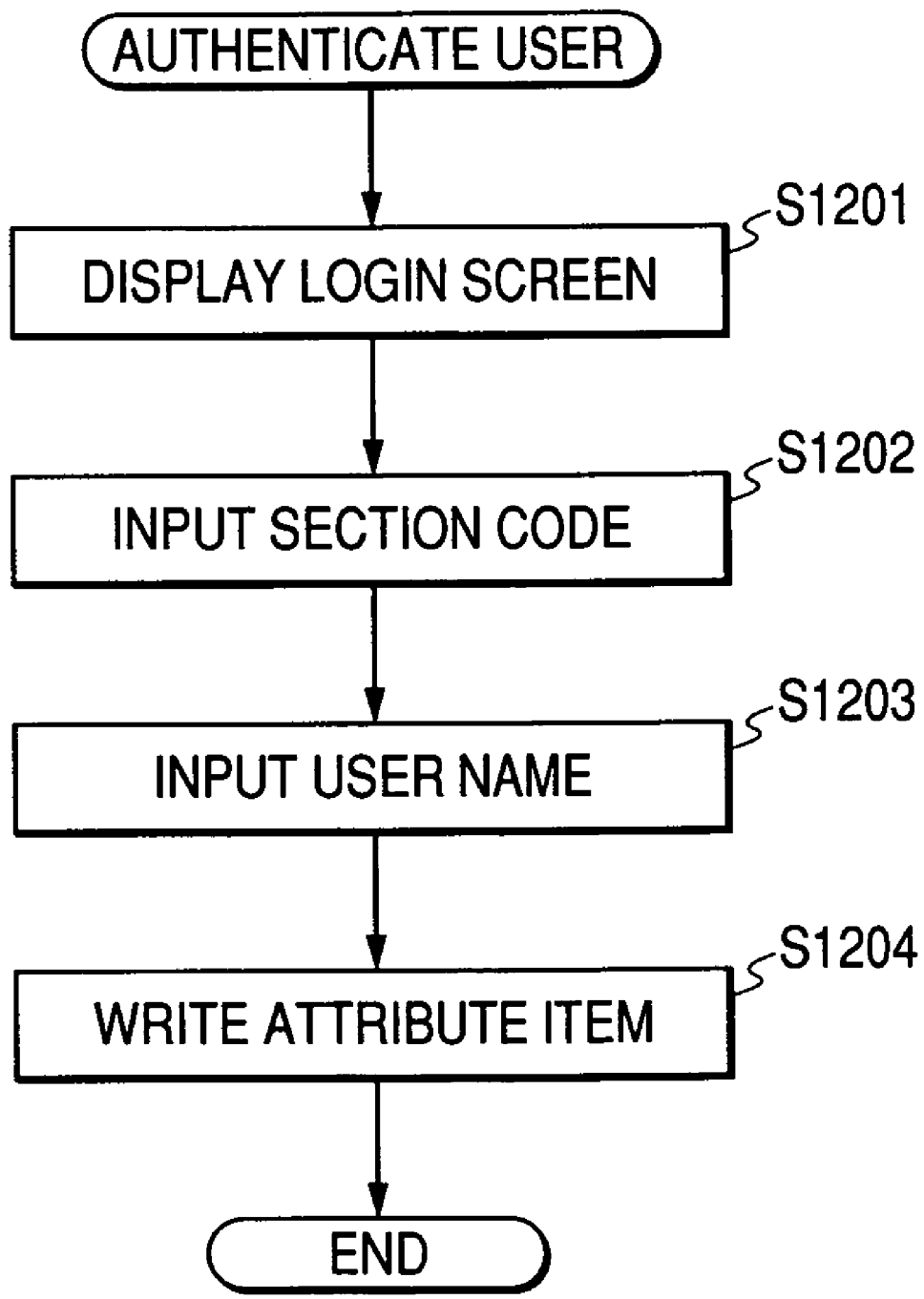
FIG. 12 is a flowchart showing user authentication processing.

In FIG. 1, the digital multi function peripheral MFP2 authenticates a user who uses the digital multi function peripheral MFP2 (Step S101). The user authentication is shown in the flowchart of FIG. 12 in detail. The digital multi function peripheral MFP2 displays the initial screen of login on the operation unit 61 by the LCD controller 57 (Step S1201). A user inputs the section code indicating the belonging section on the initial screen of login (Step S1202). The section code is used for totalization and accounting of an MFP usage fee as the need arises.

Successively, the user inputs a user name on the initial screen of login (Step S1203). Because a user name is stored in the HD 60 together with document information, it becomes easy to retrieve the stored document information. The attribute items decided according to the contents obtained from a user by the input are written in the predetermined regions of the HD 60 (Step S1204).

Returning to FIG. 1, when the user performs the combination designation of the read image data of a manuscript with the operation unit 61 of the digital multi function peripheral MFP2 (Step S102), the digital multi function peripheral MFP2 retrieves the other digital multi function peripherals MFP connected to the LAN 40 with the network controller 59, and performs the transmission request of the apparatus information thereof to the other digital multi function peripherals MFP (Step S103). The other digital multi function peripherals MFP (the digital multi function peripherals MFP1 and MFP3 in the present embodiment) transmit their apparatus information to the digital multi function peripheral MFP2 in answer to the transmission request of the apparatus information, respectively (Steps S121 and S141).

With the operation unit 61 of the digital multi function peripheral MFP2, the user designates a combination destination apparatus (an apparatus of an object to which an image data combination is performed) based on the apparatus information obtained from the other digital multi function peripherals MFP (MFP1 and MFP3) (Step S105). It is supposed that the user designates the digital multi function peripheral MFP1 as the combination destination apparatus in the present embodiment. At this time, the digital multi function peripheral MFP2 notifies the digital multi function peripheral MFP1 of the designation as the combination destination apparatus with the network controller 59, and the digital multi function peripheral MFP1 transfers the combination document management table thereof to the digital multi function peripheral MFP2 as the information of the image data stored in the box region of the HD 60 thereof (Step S122). Incidentally, when the digital multi function peripheral MFP1 has no combination document management tables, the digital multi function peripheral MFP1 transfers the document management table thereof. To put it concretely, the digital multi function peripheral MFP1 transfers the combination document management tables 502 and 503, or the document management table 504 of FIG. 5, or the like.

Incidentally, when a transfer restriction, for example, such that a transfer is permitted in the case where section codes are consistent with each other or in the case where users are consistent with each other according to the results of the user authentication, and such that a transfer is not permitted in the other cases, is performed relative to the transfers of combination document management tables, the security level of the system can be improved.

Next, the digital multi function peripheral MFP2 displays document information on the operation unit 61 with the LCD controller 57 based on the combination document management table obtained from the digital multi function peripheral MFP1 to let the user select the document information to be combined (Step S106). The digital multi function peripheral MFP2 sends the document information selected by the user to the digital multi function peripheral MFP1.

The digital multi function peripheral MFP1 transfers a page management table to the digital multi function peripheral MFP2 as the document data according to the document information selected by the digital multi function peripheral MFP2 (Step S123). For example, when the combination document management table (111. pdf) 502 of FIG. 5 is selected, the digital multi function peripheral MFP 1 transfers the document management tables 510, 511 and 512 to the digital multi function peripheral MFP2. Because the document management table has been already sent to the digital multi function peripheral MFP2 in case of being not a combination document, Step S123 is omitted.

Next, the user designates the combination position of the document with the operation unit 61 of the digital multi function peripheral MFP2 (Step S107), sets a manuscript on the manuscript stand of the reader unit 20, presses the start key (not shown) of the operation unit 61, and starts the reading of the manuscript (Step S108). Thereby, the read image data of the manuscript is sequentially stored in the HD 60 of the digital multi function peripheral MFP2, and the management tables of the document data are generated at the same time (Step S109). Moreover, the reading start of the manuscript is notified also to the digital multi function peripheral MFP1 of the combination destination of the document. The management tables generated at Step S109 are a document management table and a page management table.

Next, the digital multi function peripheral MFP2 updates the document management tables 510-512 obtained from the digital multi function peripheral MFP1, the document management tables newly generated at Step S109, and a combination document management table and a document management table according to the designated combination position (Step S110). For example, when the image data read from the manuscript is combined after a 111c.pdf file in the digital multi function peripheral MFP2, the document management tables 510 and 511 are not changed, and the value of a new document management table is set at the next cue of the document management table 512 for the 111c.pdf file. Then, the value of the document management table 512 for the 111c.pdf file is set at the address of the back cue of the new document management table. Moreover, because the combination documents have increased in number, the document number of the combination document management table 502 is rewritten.

Next, the digital multi function peripheral MFP2 transfers the combination document management table and the document management table which have been obtained from the digital multi function peripheral MFP1 and have been updated at Step S110 to the digital multi function peripheral MFP1. Moreover, the digital multi function peripheral MFP2 transfers the document management table, the page management table and page data which have been newly generated by the digital multi function peripheral MFP2 to the digital multi function peripheral MFP1 (Step S111).

The digital multi function peripheral MFP1 temporarily stores the data received from the digital multi function peripheral MFP2 into the RAM 52 (Step S124), updates the combination document management table and the document management table (Step S125), and stores the document management table, the page management table and the page data of the new combination document in the box region of the HD 60. After the storing processing has been completed, the digital multi function peripheral MFP1 notifies the digital multi function peripheral MFP2 of the completion of the processing, and thereby a series of the processing ends (Step S126).

FIG. 13A is a view showing a display example of the combination destination apparatus designating screen, and FIGS. 13B and C are views showing display examples of the combination file designating screens.

FIG. 13A shows a combination destination apparatus designating-screen 1301 displayed on the operation unit 61 in response to the "designation of the combination destination apparatus" of Step S105 in FIG. 1, and the digital multi function peripherals (MFP1, MFP2 and MFP3) of the present image processing system are displayed. The designation of a combination destination apparatus can be performed on the combination destination apparatus designating screen 1301. The user, for example, selects the digital multi function peripheral MFP1 to depress an O.K. key 1311 in accordance with displayed messages. Incidentally, a reference numeral 1312 denotes a return key.

FIGS. 13B and 13C severally show combination destination file designating screens 1302 and 1303 displayed on the operation unit 61 in response to the "selection of a combination destination file" of Step S106 of FIG. 1, and the files stored in the box region of the digital multi function peripheral MFP1 are displayed. A combination destination file can be designated on the combination destination file designating screens 1302 and 1303. The user, for example, selects the file 111.pdf in accordance with displayed messages, and presses the O.K. key 1311.

FIGS. 14A and 14B are vies showing display examples of the combination position designating screens.

FIGS. 14A and 14B show combination position designating screens 1304 and 1305 severally displayed on the operation unit 61 in response to the "designation of a combination position" of Step S107 of FIG. 1, and each document constituting a combined document is displayed. It can be instructed at which portion of each document the image data newly read from a manuscript is combined on the combination position designating screens 1304 and 1305. After the user has designated a combination position in accordance with the displayed message, the user depresses the O.K. key 1311, depresses the start key (not shown) of the operation unit 61, and starts processing.

That is, in the present embodiment, it is possible to perform the designation to add the image data read from the document with a digital multi function peripheral of an image data transmission source on the combination position designating screens 1304 and 1305 of the operation unit 61 to an arbitrary page of the image data of the document of a digital multi function peripheral of an image data combination destination.

Figure 15:
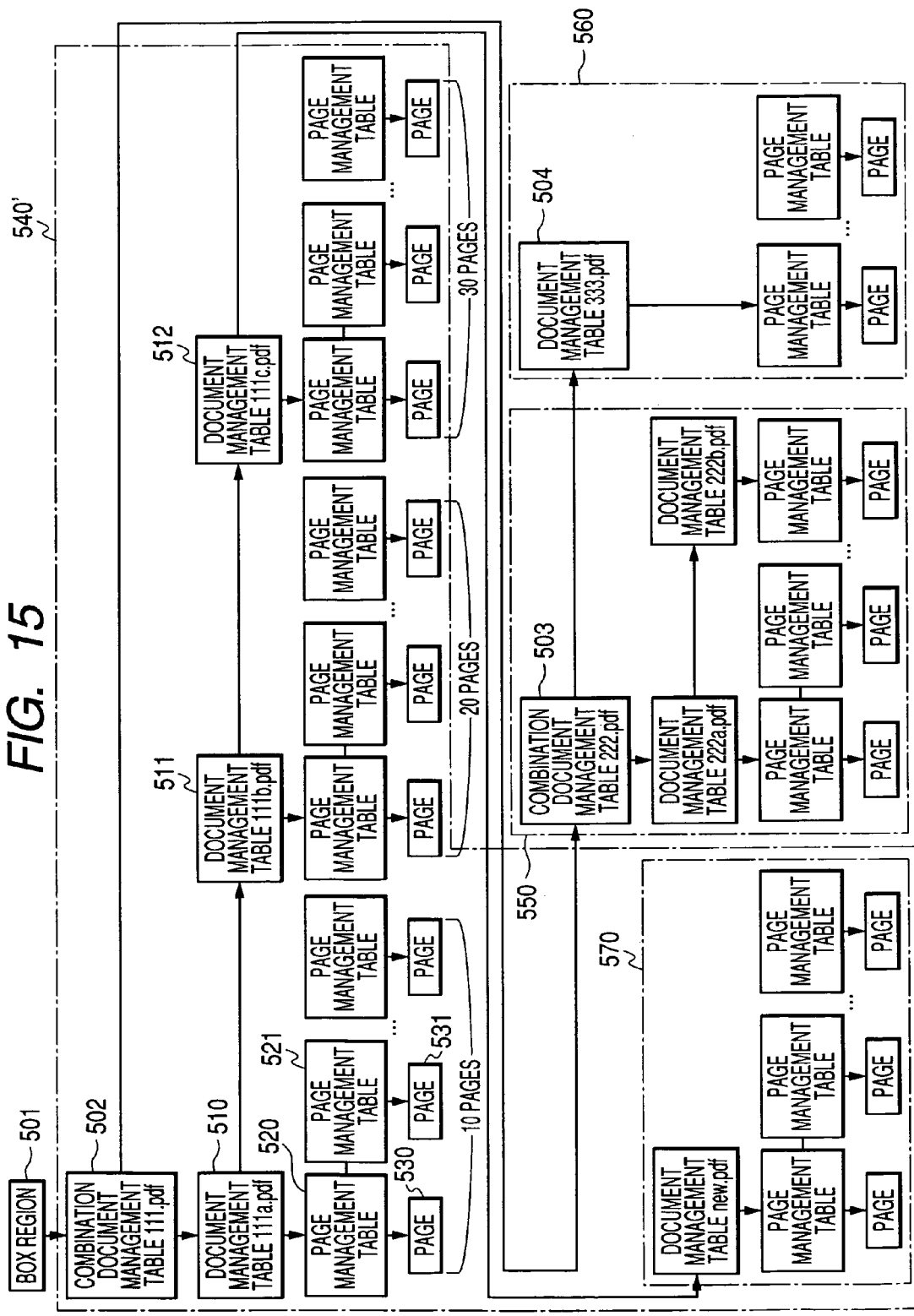
FIG. 15 is a block diagram showing the document management configuration in the box region of the HD after image data combining processing.

FIG. 15 is a block diagram showing the document management configuration in the box region of the HD 60 after image data (document) combination processing.

In FIG. 15, as a result of the image data combining processing described in FIG. 1, as shown in a storage region 540', a document management table, each page management table and each page, which are enclosed by an alternate long and two short dashes line 570 in the storage region 540', are added to the document management configuration in the box region of FIG. 5, and a link to the document management table 512 is formed.

As described above, according to the present embodiment, a digital multi function peripheral MFP of a combination destination sends a management table to manage the image data of the digital multi function peripheral MFP of the combination destination to a digital multi function peripheral MFP of a transmission source. The digital multi function peripheral MFP of the transmission source designates an image data combination position, and generates a management table to manage the image data of the digital multi function peripheral MFP of the transmission source. Furthermore, the digital multi function peripheral MFP of the transmission source generates a management table in which the management table of the transmission source is added to the management table of the combination destination, and transfers the image data and the management table of the digital multi function peripheral MFP of the transmission source to the digital multi function peripheral MFP of the combination destination. The digital multi function peripheral MFP of the combination destination combines the image data of the digital multi function peripheral MFP of the transmission source and the image data of the digital multi function peripheral MFP of the combination destination based on the management table and the combination position.

Thereby, it is possible to easily and fast perform image data combining processing (electronization processing) for reading a large quantity of manuscripts with a plurality of digital multi function peripherals MFP to generate the images read from the large quantity of manuscripts as a piece of electronic data.

Second Embodiment

A second embodiment of the present invention is different from the first embodiment described above in the following points. Because the other elements of the present embodiment are the same as the corresponding ones of the first embodiment (FIGS. 2 and 3) described above, their descriptions are omitted.

In the first embodiment described above, the image data combination in case of using two digital multi function peripherals MFP has been described. On the other hand, in the present embodiment, the image data combination in case of using three digital multi function peripherals MFP is described.

Figure 16:
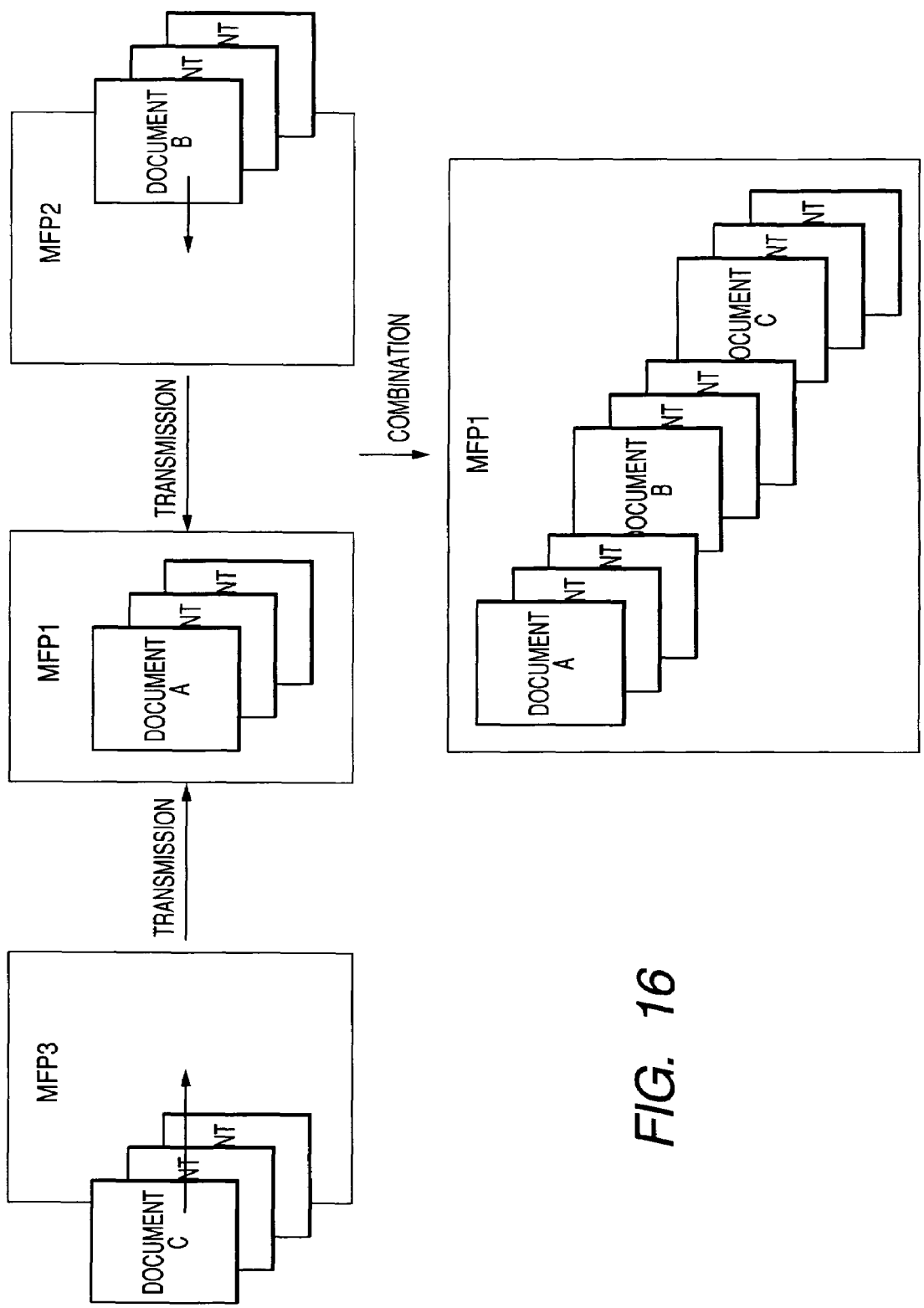
FIG. 16 is a view showing an image of the image data combination at the time of using three sets of the digital, multi function peripherals according to a second embodiment of the present invention.

FIG. 16 is a view showing the image of the image data combination in case of using three digital, multi function peripherals MFP1, MFP2 and MFP3 according to the present embodiment.

In FIG. 16, to the image data of a document A stored in the box region of the digital multi function peripheral MFP1, image data is read from a document B with the digital multi function peripheral MFP2, and the image data of the document B is combined with the image data of the document A. Furthermore, to the image data of the document A stored in the box region of the digital multi function peripheral MFP1, image data is read from a document C with the digital multi function peripheral MFP3, and the image data of the document C is combined with the image data of the document A. Thereby, each image data of the documents A, B and C is combined with one another in the box region of the digital multi function peripheral MFP1, and the combined image data is generated as one document.

Figure 17:
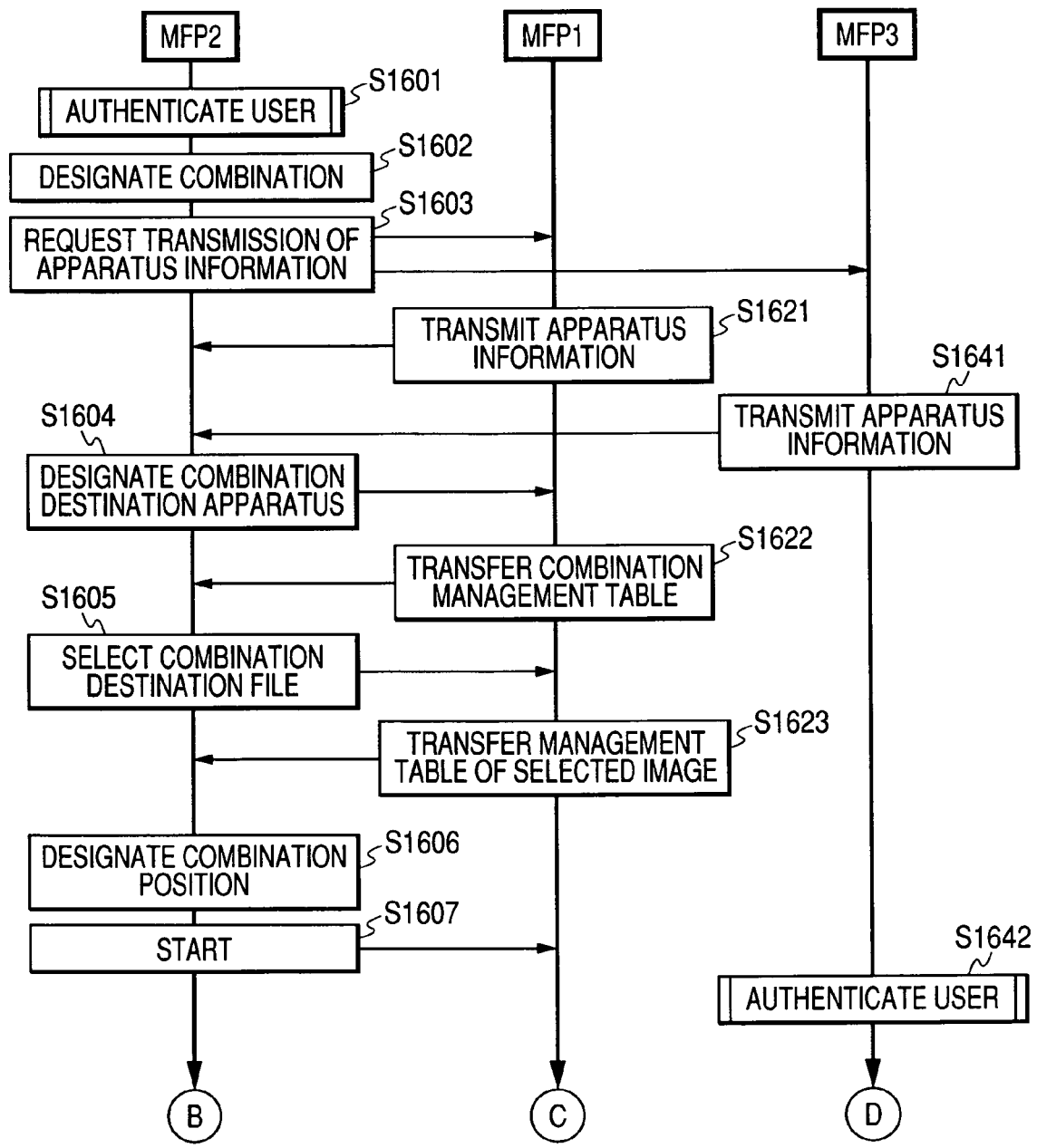
FIG. 17 is a flowchart showing the image data combining processing of the second embodiment of the present invention.
Figure 18:
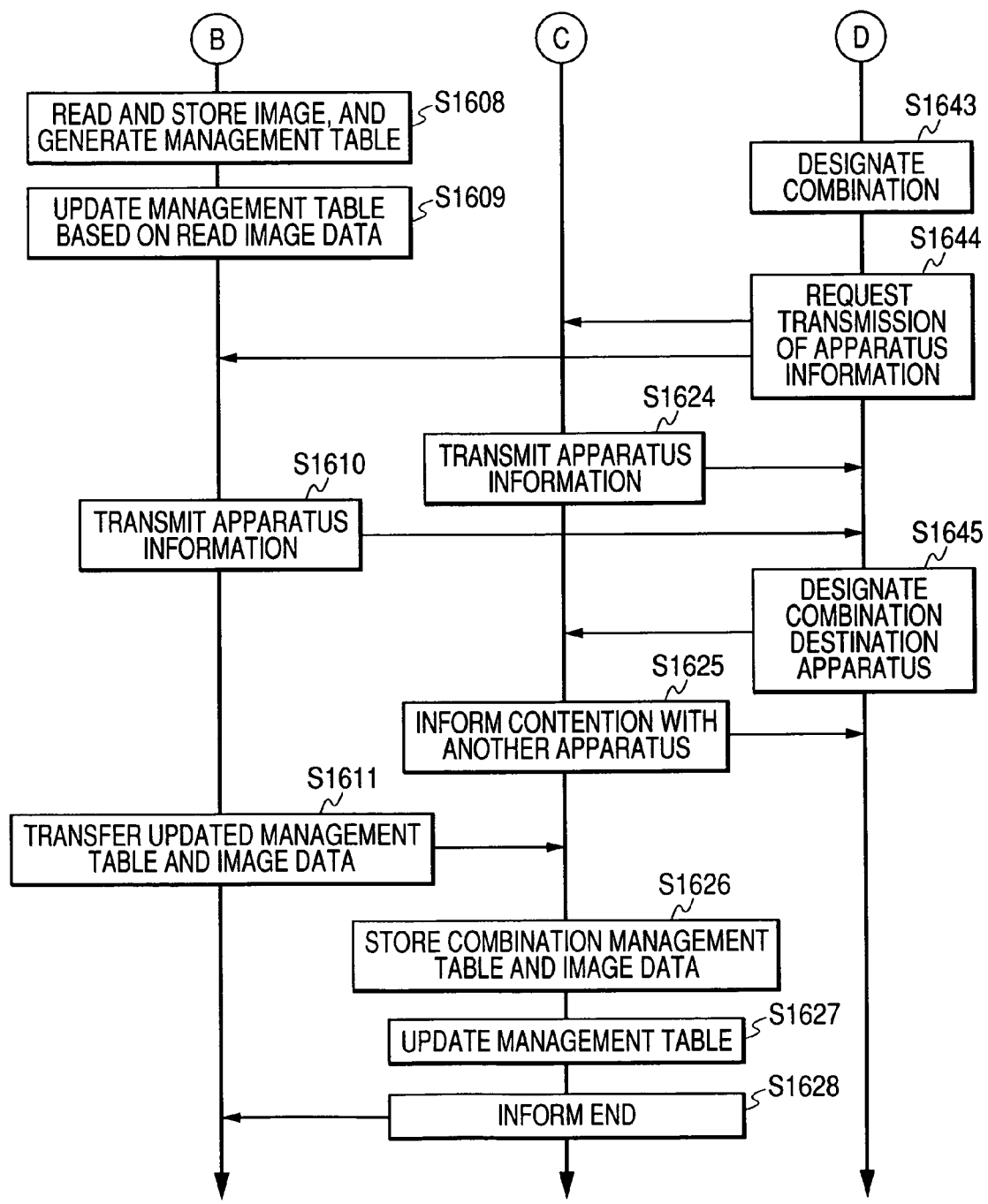
FIG. 18 is a flowchart showing the continuation of the flowchart of FIG. 17.
Figure 19:
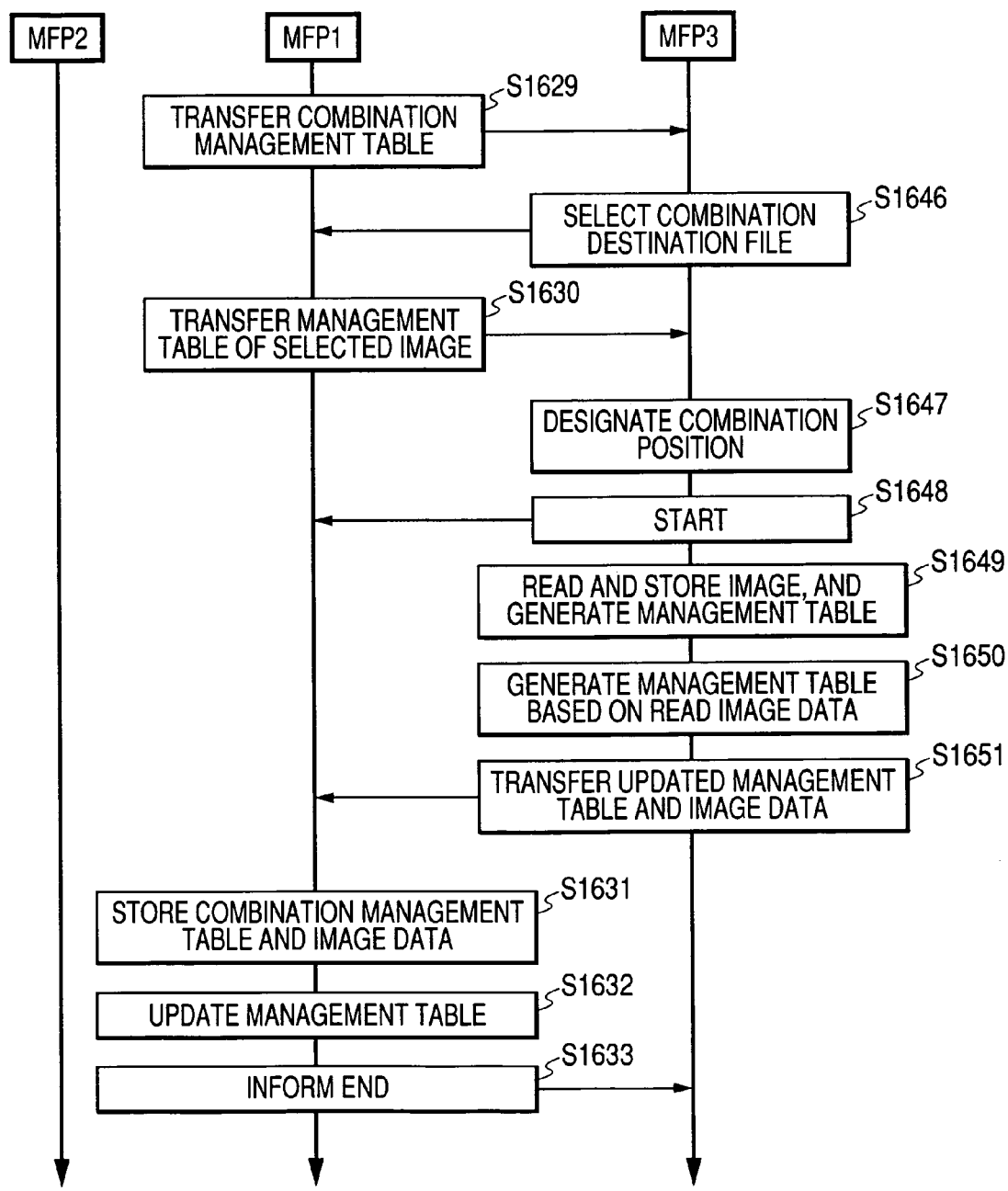
FIG. 19 is a flowchart showing the image data combining processing.

The details of the image data combination is concretely described using the flowcharts of FIGS. 17, 18 and 19.

FIGS. 17 and 18 are flowcharts showing image data combining processing.

In FIGS. 17 and 18, the processing shown in Steps S1601-S1609 of the digital multi function peripheral MFP2 is the same as the processing shown in Steps S101-S110 of the digital multi function peripheral MFP2 of FIG. 1. Moreover, the processing shown at Steps S1621-S1623 of the digital multi function peripheral MFP1 and at Step S1641 of the digital multi function peripheral MFP3 are also the same as that of the processing shown in Steps S121-S123 of the digital multi function peripheral MFP1 of FIG. 1 and Step S141 of the digital multi function peripheral MFP3 of FIG. 1. In order to perform image data combination to the image data stored in the box region of the digital multi function peripheral MFP1 by the processing of the steps mentioned above, the reading of a manuscript is started using the digital multi function peripheral MFP2, and the storing of the image data is started.

Moreover, the reading of a manuscript is started using the digital multi function peripheral MFP3, and image data combination is further performed to the image data stored in the box region of the digital multi function peripheral MFP1. In advance of the performance, the digital multi function peripheral MFP3 authenticates the user who uses the digital multi function peripheral MFP3 likewise in Step S1601 (Step S1642). When a user performs the combination designation of the read image data of the manuscript with the operation unit 61 of the digital multi function peripheral MFP3 (Step S1643), the digital multi function peripheral MFP3 retrieves the other digital multi function peripherals MFP connected to the LAN 40 by the network controller 59, and performs the transmission request of apparatus information to the other digital multi function peripherals MFP (Step S1644). The other digital multi function peripherals MFP (MFP2 and MFP1) severally transmit the apparatus information thereof to the digital multi function peripheral MFP3 in response to the transmission request of the apparatus information (Steps S1610 and S1624).

The user designates a combination destination apparatus (an apparatus of the object from which image data combination is performed) based on the apparatus information obtained from the other digital multi function peripherals MFP (MFP2 and MFP1) with the operation unit 61 of the digital multi function peripheral MFP3 (Step S1645). In the present embodiment, it is supposed that the user designates the digital multi function peripheral MFP1 as the combination destination apparatus. At this time, because the digital multi function peripheral MFP1 is under the image data combining processing with the digital multi function peripheral MFP2, the digital multi function peripheral MFP1 designated as the image data combination destination from the digital multi function peripheral MFP3 notifies the digital multi function peripheral MFP3 that the contention with another apparatus has occurred (Step S1625).

On the other hand, after the completion of the reading of the image from the manuscript and the storage of the image data, the digital multi function peripheral MFP2 updates the management tables thereof, and transmits the management tables to the digital multi function peripheral MFP1 together with the image data (Step S1611). By the similar procedure described above with reference to FIG. 1, the digital multi function peripheral MFP1 stores the combination document management table, the management tables and the image data in the box region of the HD 60 (Step S1626), and updates the management tables (Step S1627). The digital multi function peripheral MFP1 notifies the digital multi function peripheral MFP2 of the end of the processing when the storage processing has been completed (Step S1628).

FIG. 19 is a flowchart showing image data combining processing.

In FIG. 19, the processing shown in Steps S1646-S1651 of the digital multi function peripheral MFP3 is the same as the processing shown in Steps S106-S111 of the digital multi function peripheral MFP2 of FIG. 1. The processing shown in Steps S1629-S1633 of the digital multi function peripheral MFP1 is the same as the processing shown in Steps S122-S126 of the digital multi function peripheral MFP1 of FIG. 1.

When the image data combination by the digital multi function peripherals MFP1 and MFP2 has been completed, the digital multi function peripheral MFP1 transfers the combination document management table of the digital multi function peripheral MFP1 to the digital multi function peripheral MFP3, which has requested the image data combination (Step S1629). The user of the digital multi function peripheral MFP3 who has received the combination document management table selects a combination destination file with the operation unit 61 (Step S1646), and the digital multi function peripheral MFP1 transfers the management tables of the selected image data to the digital multi function peripheral MFP3 (Step S1630). When the user obtains the management tables of the selected image data from the digital multi function peripheral MFP1, the user designates the combination position of the image data from the management tables with the operation unit 61 of the digital multi function peripheral MFP3 (Step S1647). The user depresses the start key of the operation unit 61 (Step S1648), and starts to read the manuscript image (Step S1649).

The digital multi function peripheral MFP3 updates the image data read from the manuscript, the combination document management table and the management tables obtained from the digital multi function peripheral MFP1 (Step S1650), and transfers the updated management tables and the updated image data to the digital multi function peripheral MFP1 (Step S1651). The digital multi function peripheral MFP1 stores the combination document management table and the image data in the box region of the HD 60 (Step S1631), and updates the management tables (Step S1632). When the storage processing has been completed, the digital multi function peripheral MFP1 notifies the end of the processing to the digital multi function peripheral MFP3 (Step S1633).

Although the case where the image data combination is performed using three digital multi function peripherals is exemplified in the present embodiment, also the present invention can be applied to the case of performing the image data combination using more digital multi function peripherals.

As described above, according to the present embodiment, similarly to the case of the first embodiment described above, it is possible to easily and fast perform the image data combining processing (electronization processing) of reading a large quantity of manuscripts with a plurality of digital multi function peripherals MFP to generate the images read from the large quantity of the manuscripts as one piece of electronic data.

In particular, in the present embodiment, the large quantity of the manuscripts are read using three digital multi function peripherals MFP, and it becomes possible to generate one image file in stead of generating three image files independently at the time of performing the electronization processing of generating the images read from the large quantity of the manuscripts as a piece of electronic data.

Third Embodiment

A third embodiment of the present invention is different from the second embodiment described above in the following points. Because the other elements of the present embodiment are the same as the corresponding ones of the first embodiment (FIGS. 2 and 3) described above, their descriptions are omitted.

Although the case where the image data combination is performed using three digital multi function peripherals has been described in the second embodiment described above, the reading of the manuscript images by the digital multi function peripheral MFP3 has not been started until the image data combination by the digital multi function peripherals MFP1 and MFP2 has been completed. On the other hand, in the present embodiment, an example of achieving the reduction of the starting time to the reading processing of the manuscript images is described.

Figure 20:
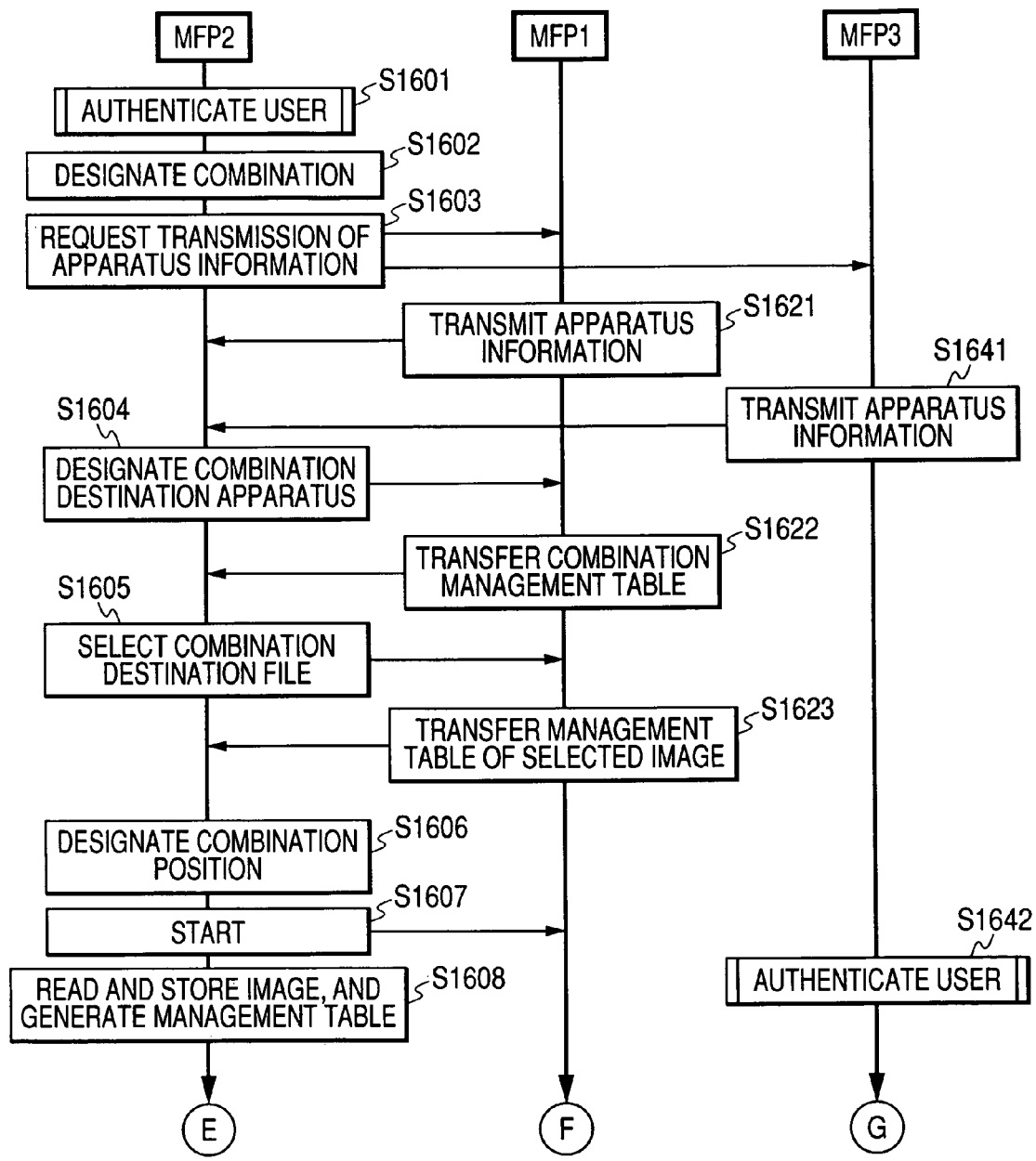
FIG. 20 is a flowchart showing the image data combining processing of a third embodiment of the present invention.
Figure 21:
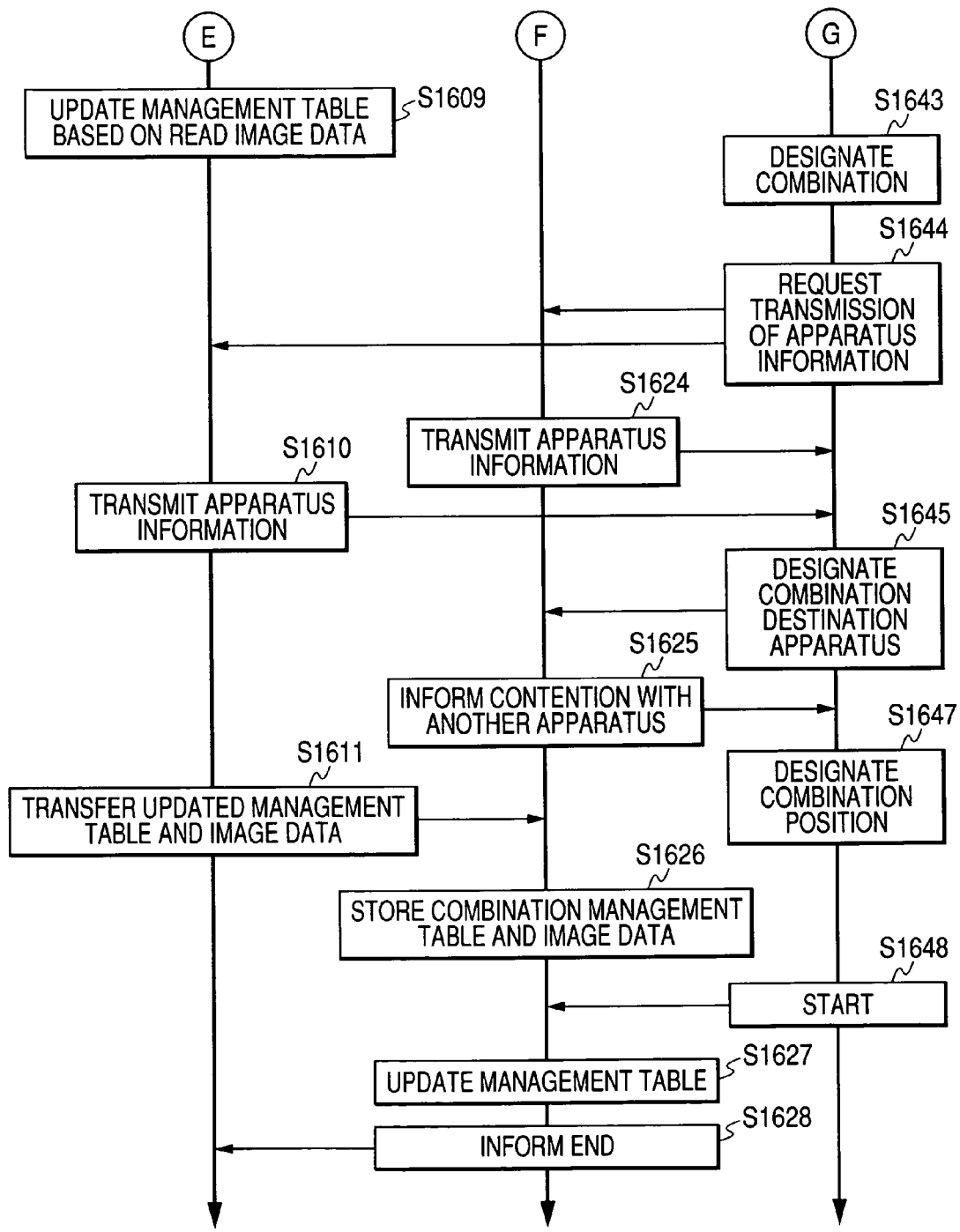
FIG. 21 is a flowchart showing the continuation of the flowchart of FIG. 20.
Figure 22:
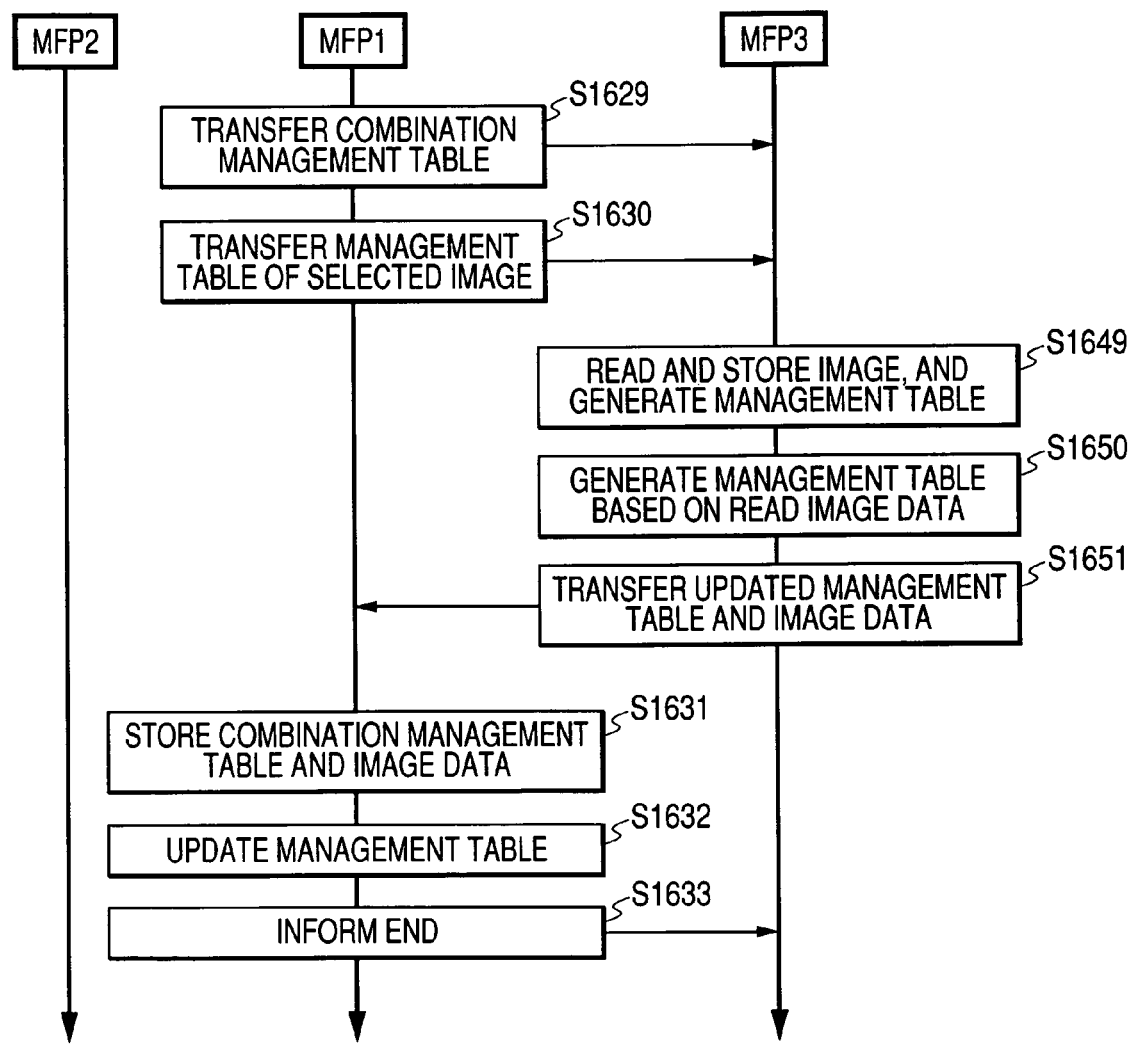
FIG. 22 is a flowchart showing the image data combining processing.

The details of the image data combination of the present embodiment are concretely described using the flowcharts of FIGS. 20, 21 and 22.

FIGS. 20 and 21 are flowcharts showing the image data combining processing according to the present embodiment.

In FIGS. 20 and 21, the point which is different from the processing shown in FIGS. 17 and 18 is the point of having changed the timing of the processing shown in Steps S1647 and S1648 of the digital multi function peripheral MFP3. Because the digital multi function peripheral MFP1 is during image data combining processing with the digital multi function peripheral MFP2, the MFP1 designated as the image data combination destination from the digital multi function peripheral MFP3 notifies the digital multi function peripheral MFP3 that the contention with another apparatus has occurred (Step S1625).

In such a case, in performing the image data combination from the digital multi function peripheral MFP3, it is rare that a new piece of image data is combined between documents, and almost all of the cases are ones of inserting the new piece of image data to the top of a document or of adding the new piece of image data to the end of a document. Moreover, because the digital multi function peripheral MFP1 is under combination of image data from the digital multi function peripheral MFP2, there is the possibility that the desired combination destination file from the digital multi function peripheral MFP3 may have been changed after the end of the image data combination. Because each document is managed under the combination document management table, it is possible to replace the documents afterward even if the documents are stored in the state in which the order of the documents has been mistaken.

Figure 23:
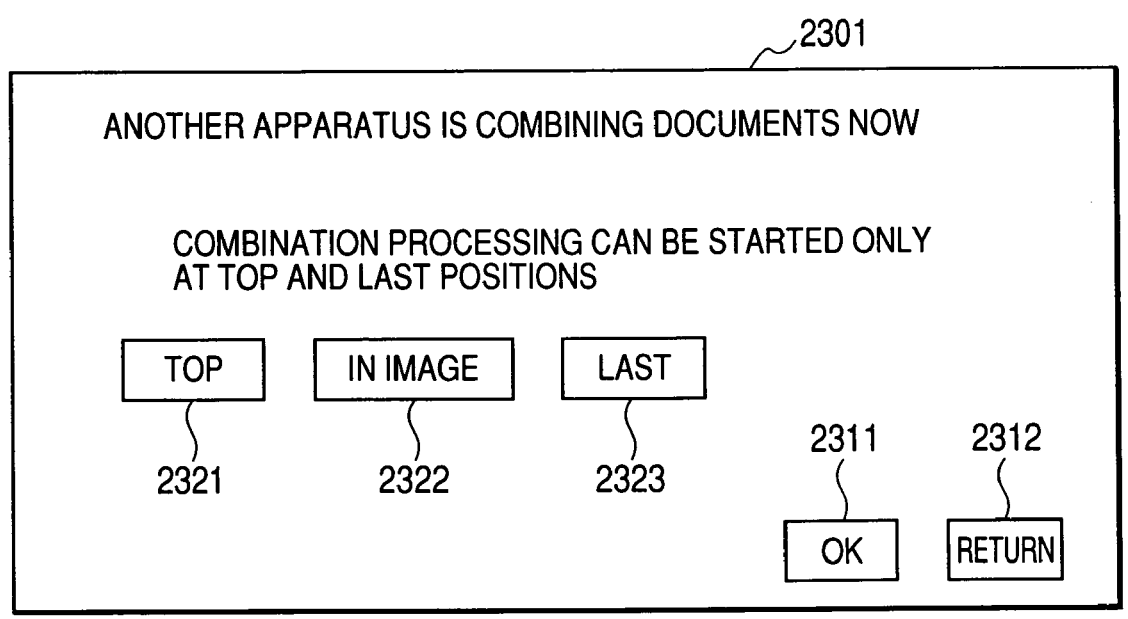
FIG. 23 is a view showing a display example of the combination position designating screen.

On a combination position designating screen 2301 shown in FIG. 23 of the operation unit 61 of the digital multi function peripheral MFP3, a user performs the designation of an image data combination position at the top or the end (last) of a document in accordance with the displayed message (Step S1647). The image data combination position can be designated by depressing a top key 2321 or a last key 2323, and then by depressing the OK key 2311. Thereby, it becomes possible to start the image data combining processing using the digital multi function peripheral MFP3 even under the image data combining processing between the digital multi function peripherals MFP1 and MFP2.

On the other hand, when an in image key 2322 of the combination position designating screen 2301 is depressed, the digital multi function peripheral MFP3 waits until the end of the image data combining processing of the digital multi function peripherals MFP1 and MFP2 has been completed. In this case, the subsequent processing becomes the same as that of the second embodiment described above.

The user designates the image data combination position, for example, as the end (the last) of a document at Step S1647, and sets a manuscript on the manuscript stand of the digital multi function peripheral MFP3. Then, by depressing the start key (not shown) of the operation unit 61 to start the reading of a manuscript image (Step S1648).

FIG. 22 is a flowchart showing image data combining processing.

In FIG. 22, the digital multi function peripheral MFP3 performs the reading of an image from a manuscript, the storing of the read image, and the generating of a combination document management table, and a document management tables from the read manuscript (Step S1649). On the other hand, when the image data combination by the digital multi function peripherals MFP1 and MFP2 has been completed, the digital multi function peripheral MFP1 transfers the combination document management table and the document management tables to the digital multi function peripheral MFP3 (Steps S1629 and S1630). The processing after that is the same as that of the second embodiment, and the description thereof is omitted.

As described above, according to the present embodiment, at the time of performing electronization processing of reading a large quantity of manuscripts with three digital multi function peripherals MFP to generate the images read from the large quantity of manuscripts as a piece of electronic data, when two digital multi function peripherals MFP are under image data combining processing, the designation of adding the image data of the other digital multi function peripheral MFP to the top or the end of the image data of the digital multi function peripheral MFP of the combination destination is performed.

Thereby, even when two digital multi function peripherals are under image data combining processing, the image data combining processing using the other digital multi function peripheral MFP can be started. Consequently, the electronization processing can be progressed at a high speed.

Other Embodiments

Although the processing shown in the flowchart of FIG. 1 in the image processing system shown in FIG. 2 has been exemplified in the first to the third embodiments mentioned above, the present invention is not limited to the processing mentioned above. It is needless to say that various changes can be performed without departing from the sprit and scope of the present invention. For example, as the configuration of the image processing system, in addition to the configuration of FIG. 2, the configuration in which an arbitrary number of digital multi function peripherals and a scanner are connected through a network, the configuration in which an arbitrary number of digital multi function peripherals, a scanner and a printer are connected through a network, the arbitrary number of digital multi function peripherals, a scanner and a computer are connected through a network, and the like can be considered. Moreover, also as for the configuration of the combination document management table, the document management tables and the page management tables, it is possible to add, delete and/or change the items in each management table appropriately according to the use form of the image processing system.

Although the image data combination at the time of using a plurality of digital multi function peripherals has been exemplified in the first to the third embodiments, the present invention is not limited to such a form. The present invention can be also applied to the image data combination at the time of using a single digital multi function peripheral a plurality of times. It may be selected with the operation unit 61 whether using the plurality of digital multi function peripherals or whether using the single digital multi function peripheral a plurality of times.

The present invention can be attained by providing the programs (the flowcharts of FIGS. 1 and 17-22) of the software realizing the functions of the embodiments described above to a computer or a CPU to make the computer or the CPU read and execute the programs.

In this case, the programs are directly supplied from a storage medium recording the programs, or are supplied by downloading from other not shown computers, databases or the like which are connected to the Internet, a commercial network, a local network or the like.

The forms of the programs may be composed of the forms of an object code, the program code executed by an interpreter, the script data supplied to an operating system (OS), and the like.

Moreover, the present invention can be also attained by supplying a storage medium storing the programs of the software realizing the functions of the embodiments mentioned above to a computer or a CPU, and by reading and executing the programs stored in the storage medium with the computer or the CPU.

In this case, the program codes read from the storage medium realize the functions of each embodiment mentioned above by themselves, and the storage medium storing the program codes constitutes the present invention.

As the storage medium storing the program codes, for example, there is are a ROM, a RAM, an NV-RAM, a floppy (registered trademark) disk, a hard disk, an optical disc (registered trademark), a magneto-optical disc, a CD-ROM, an MO, a CD-R, a CD-RW, a DVD-ROM, a DVD-RAM, a DVD-RW, a DVD+RW, a magnetic tape, a nonvolatile memory card, and the like.

The functions of the embodiments mentioned above can be executed not only by the execution of the program codes read from the computer, but also by the execution of a part or the whole of the actual processing by the OS or the like operating on the computer based on the instructions of the program codes.

Furthermore, the present invention can be attained by the read-out and the execution of programs of the software realizing the embodiments mentioned above after downloading the programs from a database or a home page on a network.

The programs can be also supped by connecting with the home page of the Internet using the browser of a client computer, and by downloading the computer programs themselves or a compressed file including an automatic installing function from a storage medium such as a hard disk.

Moreover, the programs can be supplied as follows. That is, a storage media such as a CD-ROM storing program codes after encoding the programs codes is delivered to a user; let the user who satisfies predetermined conditions download key information for solving the encoding from a home page through the Internet; and the encoded program codes are executed using the key information to install the programs.

The functions of the embodiments mentioned above can be also realized by dividing program codes into a plurality of files, and by downloading each file from a different homepage. That is, the WWW server which let a plurality of users download the program files for realizing the function processing of the present invention constitutes the present invention.

Moreover, the functions of the embodiments mentioned above can be also realized as follows. That is, after a program read from a storage medium has been written in the memory provided to a function enhancement board or a function enhancement unit connected to a computer, the CPU, the MPU or the like provided to the function enhancement board or the function enhancement unit executes a part of the whole of the actual processing based on the instructions of the program.

According to the present invention, an image processing apparatus of a transmission source designates an image data combination, generates a transmission source management table, generates an update management table in which the transmission source management table is added to the combination destination management table, and transfers image data and an update management table to the image processing apparatus of a combination destination. The image processing apparatus of the combination destination performs image data combination based on an update management table. Thereby, it is possible to easily perform image data combining processing (electronization processing) of reading a large quantity of manuscripts using a plurality of image processing apparatus to generate the images read from the large quantity of manuscripts as a piece of electronic data.

Moreover, according to the present invention, in case of performing image data combination from an image processing apparatus of another transmission source to an image processing apparatus of a combination destination during an image data combination from an image processing apparatus of a transmission source to an image processing apparatus of a combination destination, a designation of designating the image data of the image processing apparatus of the other transmission source to the top or the end of the image data of the image processing apparatus of the combination destination is performed. Thereby, for example, even if two image processing apparatus are under image data combining processing, the image data combining processing using the other image processing apparatus can be started, and the combination position of the documents can be easily grasped, and electronization processing can be progressed at a high speed.

The present application claims priority from Japanese Patent Application No. 2004-262796, which is incorporated herein by reference.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-262796 filed Sep. 9, 2004, which is hereby incorporated by reference herein.

What is claimed is:

1. An image processing apparatus for transmitting, obtaining, and combining image data, said apparatus comprising:
   an image data inputting unit adapted to input image data of a transmission source;
   a sending unit adapted to send combination destination management information to an image processing apparatus of said transmission source, said combination destination management information including managing image data of a combination destination when the image data of said combination destination and the image data of said transmission source are combined;
   a first obtaining unit adapted to obtain said combination destination management information;
   a designating unit adapted to designate a combination of the image data of said transmission source with the image data of said combination destination;
   a first generating unit adapted to generate transmission source management information for managing the image data of said transmission source;
   a second generating unit adapted to generate update management information, in which said transmission source management information is added to said combination destination management information;
   a transferring unit adapted to transfer the image data of said transmission source and said update management information to said image processing apparatus of said combination destination;
   a second obtaining unit adapted to obtain the image data of said transmission source and said update management information; and
   a combining unit adapted to combine the image data of said combination destination with the image data of said transmission source based on said update management information,
   wherein said designating unit is also adapted to designate the image data of said combination destination of said combination destination of the image data of said transmission source,
   wherein said designating unit is also adapted to designate a combination position of the image data of said combination destination of said combination destination of the image data of said transmission source, and
   wherein said designating unit is also adapted to add the image data of said transmission source to an arbitrary page of said combination destination.

2. An image processing apparatus according to claim 1, wherein, when an image processing apparatus of another transmission source performs an image data combination to said image processing apparatus of said combination destination during an image data combination from said image processing apparatus of said transmission source to said image processing apparatus of said combination destination, said designating unit performs a designation of adding the image data of said image processing apparatus of said other transmission source to a beginning or an end of the image data of said combination destination.

3. A method of controlling an image processing apparatus for transmitting, obtaining, and combining image data, the method comprising:
   an image data inputting step of inputting image data from a transmission source;
   a sending step of sending combination destination management information to an image processing apparatus of the transmission source, the combination destination management information including managing image data of a combination destination when the image data of the combination destination and the image data of the transmission source are combined;
   a first obtaining step of obtaining the combination destination management information;
   a designating step of designating a combination of the image data of the transmission source with the image data of the combination destination;
   a first generating step of generating transmission source management information for managing the image data of the transmission source;
   a second generating step of generating update management information, in which the transmission source management information is added to the combination destination management information;
   a transferring step of transferring the image data of the transmission source and the update management information to the image processing apparatus of the combination destination;
   a second obtaining step of obtaining the image data of the transmission source and the update management information; and
   a combining step of combining the image data of the combination destination with the image data of the transmission source based on the update management information,
   wherein the designating step also designates the image data of the combination destination of the combination destination of the image data of the transmission source,
   wherein the designating step also designates a combination position of the image data of the combination destination of the combination destination of the image data of the transmission source, and
   wherein the designating step also adds the image data of the transmission source to an arbitrary page of the combination destination.

4. A storage medium storing a computer program for carrying out a control method in an image processing apparatus for transmitting, obtaining, and combining image data, the control method comprising:
   an image data inputting step of inputting image data from a transmission source;
   a sending step of sending combination destination management information to an image processing apparatus of the transmission source, the combination destination management information including managing image data of a combination destination when the image data of the combination destination and the image data of the transmission source are combined;
   a first obtaining step of obtaining the combination destination management information;
   a designating step of designating a combination of the image data of the transmission source with the image data of the combination destination;

a first generating step of generating transmission source management information for managing the image data of the transmission source;

a second generating step of generating update management information, in which the transmission source management information is added to the combination destination management information;

a transferring step of transferring the image data of the transmission source and the update management information to the image processing apparatus of the combination destination;

a second obtaining step of obtaining the image data of the transmission source and the update management information; and a combining step of combining the image data of the combination destination with the image data of the transmission source based on the update management information, wherein the designating step also designates the image data of the combination destination of the combination destination of the image data of the transmission source, wherein the designating step also designates a combination position of the image data of the combination destination of the combination destination of the image data of the transmission source, and wherein the designating step also adds the image data of the transmission source to an arbitrary page of the combination destination.

* * * * *